(12) United States Patent
Shindou et al.

(10) Patent No.: US 6,767,275 B2
(45) Date of Patent: Jul. 27, 2004

(54) MACHINING APPARATUS FOR WORKPIECE AND METHOD THEREFOR

(75) Inventors: Hiroshi Shindou, Tokyo (JP); Masahiro Sasaki, Tokyo (JP); Akio Ogawa, Tokyo (JP); Tetsuo Abe, Tokyo (JP); Masaki Kouzu, Tokyo (JP); Masao Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 132 days.

(21) Appl. No.: 09/789,547

(22) Filed: Feb. 22, 2001

(65) Prior Publication Data
US 2001/0055933 A1 Dec. 27, 2001

(30) Foreign Application Priority Data
Feb. 22, 2000 (JP) .......................................... 2000-44145

(51) Int. Cl.[7] .............................. B24B 9/00; B24B 7/00
(52) U.S. Cl. .............................. 451/41; 451/5; 451/55; 451/158; 451/276; 451/279; 451/387
(58) Field of Search .......................... 29/603.16; 451/5, 451/10, 11, 12, 41, 55, 59, 63, 276, 278, 279, 285–290, 364, 387, 397, 398

(56) References Cited
U.S. PATENT DOCUMENTS

| | | |
|---|---|---|
| 4,689,877 A | 9/1987 | Church |
| 5,065,483 A | 11/1991 | Zammit |
| 5,210,667 A | 5/1993 | Zammit |
| 5,620,356 A | 4/1997 | Lackey et al. |
| 5,951,371 A * | 9/1999 | Hao .............................. 451/5 |
| 5,993,290 A | 11/1999 | Yoshihara et al. |
| 6,045,431 A * | 4/2000 | Cheprasov et al. ............ 451/5 |
| 6,217,425 B1 * | 4/2001 | Shindou et al. .......... 29/603.16 |

FOREIGN PATENT DOCUMENTS

| | | |
|---|---|---|
| JP | 60-076011 | 4/1985 |
| JP | 2-095572 | 4/1990 |
| JP | 5-44085 | 7/1993 |
| JP | 7-112672 | 12/1995 |
| JP | 11-016124 | 1/1999 |

* cited by examiner

*Primary Examiner*—Timothy V. Eley
(74) *Attorney, Agent, or Firm*—Oblon, Spivak, McClelland, Maier & Neustadt, P.C.

(57) ABSTRACT

To provide an apparatus that may impart a complicated bend deformation to an object to be machined such as a ceramic bar elongated in one direction or the like, and may reduce the non-uniformity in machining amount of the object to be machined upon the machining work of the object to be machined, specifically a correcting mechanism for deforming the object to be machined together with a jig holding the object to be machined is provided in a machining apparatus. The correcting mechanism includes a base, a plurality of levers provided at first ends with pins, a shaft fixed to the base for rotatably supporting the levers, and a plurality of correcting drive means coupled to second ends of said levers for pivoting the levers to the shaft to thereby pivoting the pins. The jig includes a plurality of load receiving portions arranged in a holding portion elongated on one direction for holding the object to be machined whereby portions corresponding to the load receiving portion in the holding portion are deformed together with the object to be machined in accordance with pivoting of each pin.

39 Claims, 20 Drawing Sheets

MACHINING APPARATUS FOR WORKPIECE AND METHOD THEREFOR

BACKGROUND OF THE INVENTION

1. Field of the Invention

The present invention relates to a polishing machining apparatus and a machining method for machining a workpiece to be polished where a plurality of magnetic heads are arranged, and more particularly to an apparatus and a method for correcting a bend of the workpiece during the machining work.

2. Related Background Art

A thin film magnetic head to be used in a magnetic disc apparatus or the like is composed of parts obtained by machining a rod-shaped ceramic (hereinafter referred to as a ceramic bar) where a number of element parts made of a magnetic thin film or the like forming induction type magnetic converting elements, magnetic resistors (hereinafter referred to as MRs) elements or the like are formed in a line on a surface. Conventionally, in a batch type manufacturing process of parts for the thin film magnetic head, the ceramic bar where the plurality of element portions are formed is polished, and a process for machining a throat height or an MR height of each element part to a suitable level is executed. In general, in the magnetic disc apparatus, in order to stabilize the output characteristics from the magnetic head, it is necessary to keep a distance between the magnetic polar portions of the magnetic head and a surface of a recording medium to an extremely narrow constant distance. The value of the throat height or the like is used as an important parameter for defining this distance.

In the following description, the throat height means a length (height) of the tip end portion of the magnetic poles for performing the recording/reproduction of magnetic signals in such a head core part, i.e., the portion where the two magnetic poles face each other at a fine gap. Also, the MR height means a length (height) from the end portion of the MR element on the side facing the medium to the opposite end portion thereof. In order to make it possible to perform the suitable recording/reproduction of the signals, the values of the throat height, the MR height and the like must be selected suitably. In order to obtain the predetermined values, high precision is needed for the polishing work.

The ceramic bar is to be cut into respective element portions in a process thereafter. Each of the element portions constitutes a part of a magnetic head for the magnetic disc apparatus. In the case where the magnetic head is used in the magnetic disc apparatus, the ceramic portion becomes a slider that is to be lifted away from the magnetic disc by the blow pressure caused by the rotation of the disc. The element portion becomes a head core for performing the recording and/or reproducing the magnetic signals of the disc.

However, in general, the above-described ceramic bar has a strain, a bend or the like due to the stress caused by the formation of the element portion or the cutting operation from the ceramic substrate. It is therefore difficult to obtain the high machining precision only by fixing the ceramic bar and effecting the polishing work thereon. For this reason, a non-general polishing apparatus for performing the polishing work of the magnetic head with high precision in the form of the ceramic bar as disclosed in, for example, U.S. Pat. No. 5,620,356 or the like has been proposed. Also, the present assignee proposes some apparatus and some methods (Japanese Patent Application No. 11-162799 or the like).

An actual polishing method for the above-described ceramic bar will now be described.

First of all, the surface opposite the polishing surface of the ceramic bar, is fixed with adhesives or the like to a jig, and the surface to be polished of the ceramic bar is depressed through the jig against the polishing surface of a polishing base to perform the polishing work to the surface to be polished. The jig has a beam structure. A load is applied to several, three to seven, specific points on the jig from the outside of the jig to thereby cause deformation in the jig as a whole. Furthermore, this beam structure allows the portions fixed to the ceramic bar to be subjected to the complicated deformation by the balance adjustment of the above-described load, and the ceramic bar is bent simultaneously with the fixed portions to thereby make it possible to correct the bend or the like owned by the ceramic bar per se.

In the polishing work, in a predetermined element portion on the ceramic bar fixed to the jig, the values such as a throat height are measured optically or electrically to thereby obtain the difference between the measurement value and the target value, i.e., the amount of polished portion needed upon the measurement. The loads at the plurality of points are adjusted on the basis of the necessary polishing amount in the predetermined element portion obtained and the portion in the vicinity of the predetermined element portion, and the ceramic bar is polished while being deformed through the jig. These steps are repeated whereby the values such as the throat height and the like of all the elements formed in the ceramic bar fall within the predetermined range.

Opening portions into which pins or the like may be inserted are formed in the beam portion of the jig. The loads to the jig in the above-described process are given by transmitting the loads due to an actuator such as a low friction cylinder to the pins inserted into the opening portions of the jig through transmission parts. The adjustment of the loads to the jig is performed by adjusting the loads from this actuator, i.e., a drive amount of the actuator. Incidentally, Japanese Patent Application No. 10-178949 filed by the present applicant discloses a specific example of a jig for causing an effective deformation or a load distribution to the ceramic bar.

In a recording density in the current magnetic disc apparatus or the like, it is possible to make the values such as a throat height fall within an allowable range to some extent by a machining method of the magnetic head using the above-described jig. However, the high recording density is accelerated, and recently, the high precision of the throat height or the miniaturization of the elements are remarkable. It is difficult to make the values such as the throat height fall within the allowable range over the full length of the ceramic bar.

In the case where the allowable range of the values such as the throat height is narrowed, there is an approach to cope with this by, for example, increasing the application points of the loads that cause the deformation in the jig. However, since this leads to the increase of the number of the actuators that actually apply the loads or the transmission portions (application points) of the loads, if the actuators or the like used in the conventional apparatus are needed, it is difficult to actually perform this approach since the space for mounting the actuators or the like would be increased remarkably in view of the structure of the polishing apparatus. Also, in the case where the jig per se is miniaturized in accordance with the miniaturization of the elements, there would be a problem in that it is difficult to arrange the necessary number of the actuators or the like for applying the loads to the application points of the necessary loads, and the like.

Furthermore, in the conventional polishing method, since the affect of the repulsive force from the polishing surface exists between the application point of the load and the beam or between the application points, it is impossible to sufficiently deform the ceramic bar. Accordingly, also in some conventional cases, depending upon the allowable range of the values such as a throat height, the values of the portion that may not be deformed could not fall within the allowable range. The approach to increase the number of the application points of the load and the number of the actuators for this problem has been attempted but there is a limit in the allowable range due to the above described problem.

Also, the conventional apparatus has three to seven actuators for deforming the jig in addition to the actuator for applying the main pressure for depressing the ceramic bar against the polishing surface and adjusting the load balance at both end portions in the longitudinal direction of the ceramic bar. However, actually, in order to bend the retainer portions to a necessary level, the three to seven actuators have to have a large stroke due to the necessary bend level and the actuators that always have the large stroke and occupy the large space in the structure are necessary as in the conventional case. Moreover, in order to make it possible to provide the complicated bend, the opening portion of the jig into which the pins cooperating with the actuators are inserted is increased to provide the form that may imparts a moment in the vertical direction, in the lateral direction and in the rotational direction with respect to the opening portion. In addition, it is necessary to effect the complicated drive control for each actuator. Accordingly, the conventional apparatus is not suitable for imparting the predetermined deformation amount to the very restricted portions of the ceramic bar.

SUMMARY OF THE INVENTION

In view of the above, an object of the present invention is to provide an apparatus that easily imparts a complicated bend deformation or the like to an object to be machined (polished) such as a ceramic bar by using an actuator having a small drive stroke in comparison with a conventional apparatus to make it possible to impart a depression force also to a specific portion whereby decreasing non-uniformity of a machining (polishing) amount of the object to be machined (polished) through the machining (polishing) process of the object to be machined (polished).

In order to solve this and other objects, according to the present invention, there is provided a machining apparatus for machining an object, elongated in one direction, to be machined, comprising: a machining base with a machining surface to be rotationally driven, a machining head mounted frame disposed movably to the machining surface, and a machining head supported by the machining head mounted frame, characterized in that the machining head includes a jig for holding the object to be machined, an up-and-down moving portion moving up and down relative to the machining surface together with the jig, and a correcting mechanism supported by the up-and-down moving portion, the correcting mechanism includes a base fixed to the up-and-down moving portion, a plurality of levers each of which has a pin at one end, a shaft fixed to the base for rotatably supporting the levers, and a plurality of correcting drive means coupled to other ends of the levers for pivoting the levers with respect to the shaft to thereby pivot the pins, the jig includes a body portion fixed to the up-and-down moving portion, a holding portion elongated in one direction and fixed to the body portion for holding the object to be machined, and a plurality of load receiving portions arranged in parallel in the one direction on the holding portion, and the load receiving portions receive the pins and are driven in accordance with the pivotal movement of each pin whereby portions corresponding to the load receiving portion in the holding portion are deformed together with the object to be machined.

Also, according to the present invention, it is preferable that tip ends of the pins are substantially spherical. It is preferable that the adjacent levers each have different lengths from each other, and distances between the plurality of correcting drive means and the shaft are different from each other in accordance with a length of the levers. Also, it is preferable that the shaft supports the levers in a position in the vicinity of the pins and the correcting drive means are REC plungers.

Furthermore, in order to attain the above-noted object, according to the present invention, there is provided a machining apparatus for machining an object, elongated in one direction, to be machined, comprising: a machining base with a machining surface to be rotationally driven, a machining head mounted frame disposed movably to the machining surface, and a machining head supported by the machining head mounted frame, characterized in that the machining head includes a jig for holding the object to be machined, an up-and-down moving portion moving up and down relative to the machining surface together with the jig, and a correcting mechanism supported by the up-and-down moving portion, the correcting mechanism includes a base fixed to the up-and-down moving portion, a plurality of correcting drive means each of which is fixed at an end to the base, a shaft coupled coaxially with the correcting drive means, and pins projecting from the shaft, the jig includes a body portion fixed to the up-and-down moving portion, a holding portion elongated in one direction and fixed to the body portion for holding the object to be machined, and a plurality of load receiving portions arranged in parallel in the one direction on the holding portion, and the load receiving portions receive the pins and are driven in accordance with the movement of each pin whereby portions corresponding to the load receiving portion in the holding portion are deformed together with the object to be machined.

Furthermore, in order to attain the above-noted object, according to the present invention, there is provided a machining apparatus for machining an object, elongated in one direction, to be machined, comprising: a machining base with a machining surface to be rotationally driven, a machining head mounted frame disposed movably to the machining surface, and a machining head supported by the machining head mounted frame, characterized in that the machining head includes a jig for holding the object to be machined, an up-and-down moving portion moving up and down relative to the machining surface together with the jig, and a correcting mechanism supported by the up-and-down moving portion, the correcting mechanism includes a base fixed to the up-and-down moving portion, a plurality of substantially frame-like members fixed to the base, a plurality of correcting drive means held on centerlines of the substantially frame-like members, and a plurality of shafts extending in parallel with a drive direction of the correcting drive means, coupled at first ends with the substantially frame-like members and provided at the other ends with pins, the jig includes a body portion fixed to the up-and-down moving portion, a holding portion elongated in one direction and fixed to the body portion for holding the object to be machined, and a plurality of load receiving portions arranged in parallel in the one direction on the holding portion, and the load receiving portions receive the pins and are driven in accordance with the movement of each pin whereby portions corresponding to the load receiving portion in the holding portion are deformed together with the object to be machined.

Also, according to the present invention, it is preferable that tip ends of the pins are substantially spherical and the adjacent shafts each have different lengths from each other, and distances between the correcting drive means and the pins are different from each other in accordance with a length of the shafts. Also, according to the present invention, it is preferable that the shafts are arranged coaxially with the correcting drive means and the correcting drive means are piezoelectric element actuators.

Furthermore, in order to attain the above-noted object, according to the present invention, there is provided a machining apparatus for machining an object, elongated in one direction, to be machined, comprising: a machining base with a machining surface to be rotationally driven, a machining head mounted frame disposed movably to the machining surface, and a machining head supported by the machining head mounted frame, characterized in that the machining head includes a jig for holding the object to be machined, an up-and-down moving portion moving up and down relative to the machining surface together with the jig, and a correcting mechanism supported by the up-and-down moving portion, the correcting mechanism includes a plurality of shafts provided at ends with pins and having convex portions different from the pins, a pair of correcting drive members disposed on one line on both sides of the convex portions and clamping the convex portions, and a base fixed to the up-and-down moving portion with recess portions receiving the pair of correcting drive member and the convex portions, the pair of correcting drive members drive the convex portion in a straight line to drive the shafts and the pins in parallel with the straight line, the jig includes a body portion fixed to the up-and-down moving portion, a holding portion elongated in one direction and fixed to the body portion for holding the object to be machined, and a plurality of load receiving portions arranged in parallel in the one direction on the holding portion, and the load receiving portions receive the pins and are driven in accordance with the movement of each pin whereby portions corresponding to the load receiving portion in the holding portion are deformed together with the object to be machined.

Also, according to the present invention, it is preferable that tip ends of the pins are substantially spherical and sizes of projections of the adjacent convex portions are different from each other and the arrangement of the correcting drive members each received in the recess portion and a size of the recess portions are defined in accordance with the sizes of the convex portions. Also, according to the present invention, it is preferable that the pair of correcting drive members have a pair of pistons to be driven by pressure medium, and the base has a pair of pressure medium introduction ports in communication with a rear portion of each of the pair of pistons and the pair of adjacent pressure medium introduction ports are each arranged at different distances from a predetermined surface of the base.

Also, according to the present invention, it is preferable that one of the pair of correcting drive members has a piston to be driven by pressure medium, the other being formed of elastic member, and the base has a pressure medium introduction port in communication with a rear portion of the piston. Also, it is preferable that the pair of adjacent pressure medium introduction ports are each arranged at different distances from a predetermined surface of the base. Also, it is preferable that the pressure medium is pressurized air.

Furthermore, in order to attain the above-noted object, according to the present invention, there is provided a machining apparatus for machining an object, elongated in one direction, to be machined, comprising: a machining base with a machining surface to be rotationally driven, a machining head mounted frame disposed movably to the machining surface, and a machining head supported by the machining head mounted frame, characterized in that the machining head includes a jig for holding the object to be machined, an up-and-down moving portion moving up and down relative to the machining surface together with the jig, and a correcting mechanism supported by the up-and-down moving portion, the correcting mechanism includes a shaft, a plurality of levers composed of linear portions provided at ends with pins and supported rotatably by the shaft at portions different from the pins and driven portions coupled at end portions with the linear portions having convex portions, a pair of correcting drive members disposed in a linear manner on both sides of the convex portions while clamping the convex portions, and a base having recess portions for receiving the pair of correcting drive members and the convex portions and fixed to the up-and-down moving portion, the pair of correcting drive members drive in the linear manner to thereby drive the convex portion clamped thereby, whereby the levers and the pins are pivoted about the shaft, the jig includes a body portion fixed to the up-and-down moving portion, a holding portion elongated in one direction and fixed to the body portion for holding the object to be machined, and a plurality of load receiving portions arranged in parallel in the one direction on the holding portion, and the load receiving portions receive the pins and are driven in accordance with the pivotal movement of each pin whereby portions corresponding to the load receiving portion in the holding portion are deformed together with the object to be machined.

Also, according to the present invention, it is preferable that tip ends of the pins are spherical and it is preferable that sizes of projections of the adjacent convex portions are different from each other and the arrangement of the correcting drive members each received in the recess portion and a size of the recess portions are defined in accordance with the sizes of the convex portions. It is also preferable that the pair of correcting drive members have a pair of pistons to be driven by pressure medium, and the base has a pair of pressure medium introduction ports in communication with a rear portion of each of the pair of pistons. It is preferable that the pair of adjacent pressure medium introduction ports are each arranged at different distances from a predetermined surface of the base.

Also, it is preferable that one of the pair of correcting drive members has a piston to be driven by pressure medium, the other being formed of elastic member and the base has a pressure medium introduction port in communication with a rear portion of the piston. Its preferable that the pair of adjacent pressure medium introduction ports are each arranged at different distances from a predetermined surface of the base. Also, it is preferable the pressure medium is pressurized air and tip end portions of the pistons are substantially spherical.

Furthermore, according to the present invention, it is preferable that the jig has an electrode to be connected to an electric element formed on the object to be machined, and the correcting mechanism has a probe unit to be brought into contact with the electrode. Also, according to the present invention, it is preferable that the machining head has a balancing actuator, the jig has through holes in a central portion and both end portions in the longitudinal direction of the body portion, the jig is supported by the correcting mechanism by a fixing pin passing through the through hole in the central portion, and the jig is depressed to a direction toward the machining surface through the positioning pins at both end portions by the balancing actuator.

Also, according to the present invention, it is preferable that the machining head is supported through an adjust ring supported by the machining head mounting frame and in contact with the machining surface, and an angle of the machining head supported by the machining head mounting frame facing the machining surface is defined by the adjust ring. Also, it is preferable that the machining head is mounted rotatably to rails for mounting the machining head. Furthermore, it is preferable that the apparatus according to the invention further comprises a machining head swinging means, in which the machining head swinging means performs reciprocating rotational motion of the machining head within a predetermined angular range. It is more preferable that the object to be machined is a rod-like ceramic provided with a plurality of magnetic heads.

Furthermore, in order to attain the above-noted object, according to the present invention, there is provided a method for machining an object, to be machined, elongated in one direction by holding the object to be machined to a jig, and depressing the object to be machined to a machining surface formed in a machining base that is rotationally driven, through the jig, comprising the steps of: measuring a machining amount at a plurality of positions of the object to be machined when the object to be machined is depressed against the machining surface; and rotating a plurality of levers having pins at ends, together with the pins by a plurality of correcting drive means on the basis of the measured machining amount for imparting a predetermined deformation to the object to be machined together with the jig by the rotation of the pins with tip ends received in the jig.

Furthermore, in order to attain the above-noted object, according to the present invention, there is provided a method for machining an object to be machined, elongated in one direction by holding the object to be machined to a jig, and depressing the object to be machined to a machining surface formed in a machining base that is rotationally driven, through the jig, comprising the steps of: measuring a machining amount at a plurality of positions of the object to be machined when the object to be machined is depressed against the machining surface; and driving a plurality of shafts, disposed on the same axes with a plurality of correcting drive means and having pins, on the basis of the measured machining amount for imparting a predetermined deformation to the object to be machined together with the jig by the drive along the axes of the pins with tip ends received in the jig.

Furthermore, in order to attain the above-noted object, according to the present invention, there is provided a method for machining an object to be machined, elongated in one direction by holding the object to be machined to a jig, and depressing the object to be machined to a machining surface formed in a machining base that is rotationally driven, through the jig, comprising the steps of: measuring a machining amount at a plurality of positions of the object to be machined when the object to be machined is depressed against the machining surface; and driving a plurality of shafts having pins linearly by a pair of correcting drive means disposed on a plurality of straight lines on the basis of the measured machining amount and imparting a predetermined deformation to the object to be machined together with the jig by the drive on the straight lines of the pins with tip ends received in the jig.

DESCRIPTION OF THE PREFERRED EMBODIMENTS (First Embodiment)

Figure 1:
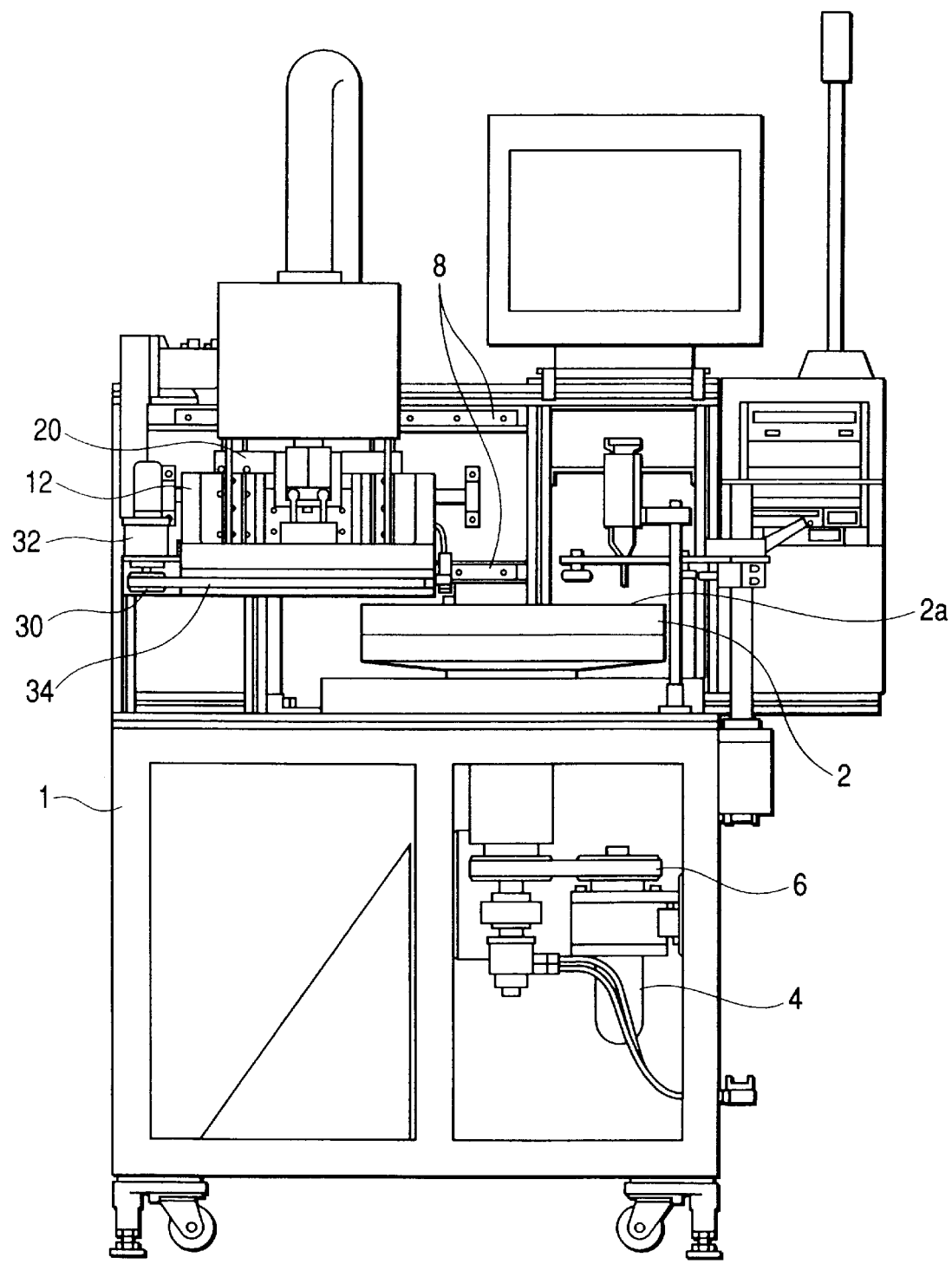
FIG. 1 is an overall frontal view showing a polishing apparatus of a magnetic head in accordance with an embodiment of the present invention.
Figure 2:
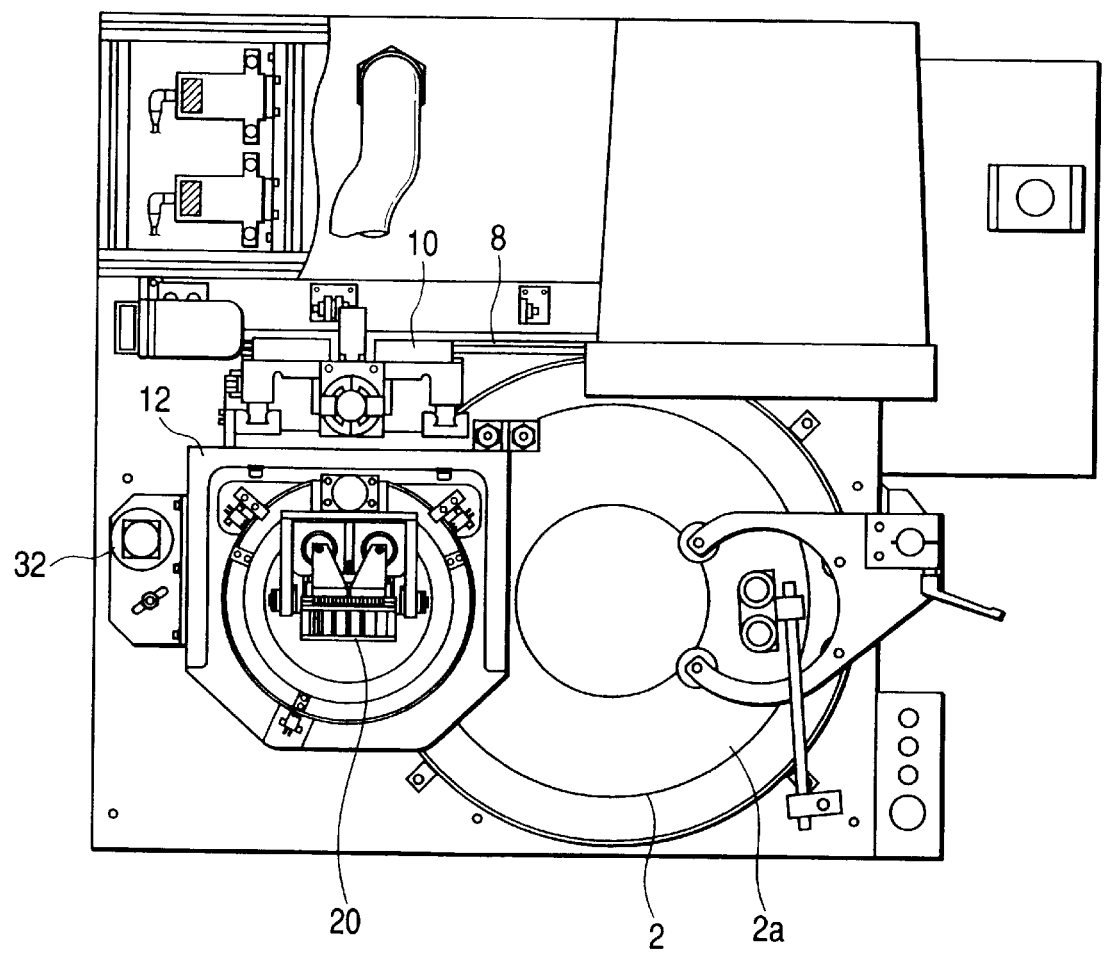
FIG. 2 is an overall plan view showing the polishing apparatus of the magnetic head in accordance with the embodiment of the present invention.

A machining apparatus, i.e., a polishing apparatus of a magnetic head in accordance with a first embodiment of the present invention will now be described with reference to the accompanying drawings. FIG. 1 is an overall frontal view showing the polishing apparatus of the magnetic head in accordance with the embodiment of the invention. FIG. 2 is a plan view. The overall structure of the magnetic head polishing apparatus will now be described with reference to FIGS. 1 and 2. The magnetic head polishing apparatus is provided with a base 1. A polishing base 2 which is a machining base is supported rotatably in a horizontal plane by the base 1. Furthermore, the polishing base 2 is rotationally driven through a belt 6 by a base drive motor 4 that is a rotary drive source provided within the base 1.

Also, a pair of guide rails 8 that are away from each other in the vertical direction are supported by the upper portion of the base 1 so as to extend in the horizontal direction. Furthermore, a lateral movement slider 10 is guided to be slidable in the horizontal direction by the pair of guide rails 8. A polishing head mounted frame 12 that is a machining head mounted frame is mounted on the lateral movement slider 10 to be movable in the vertical direction (to be driven vertically for adjustment of the height level). The drive of the lateral movement slider 10 may be executed by, for example, threadedly engaging a ball screw nut on the slider 10 side with a ball screw shaft in parallel with the guide rails 8 and rotationally driving the ball screw shaft by a motor. Furthermore, the slider 10 and the polishing head mounting frame 12 may take a reciprocation linear motion.

Figure 3:
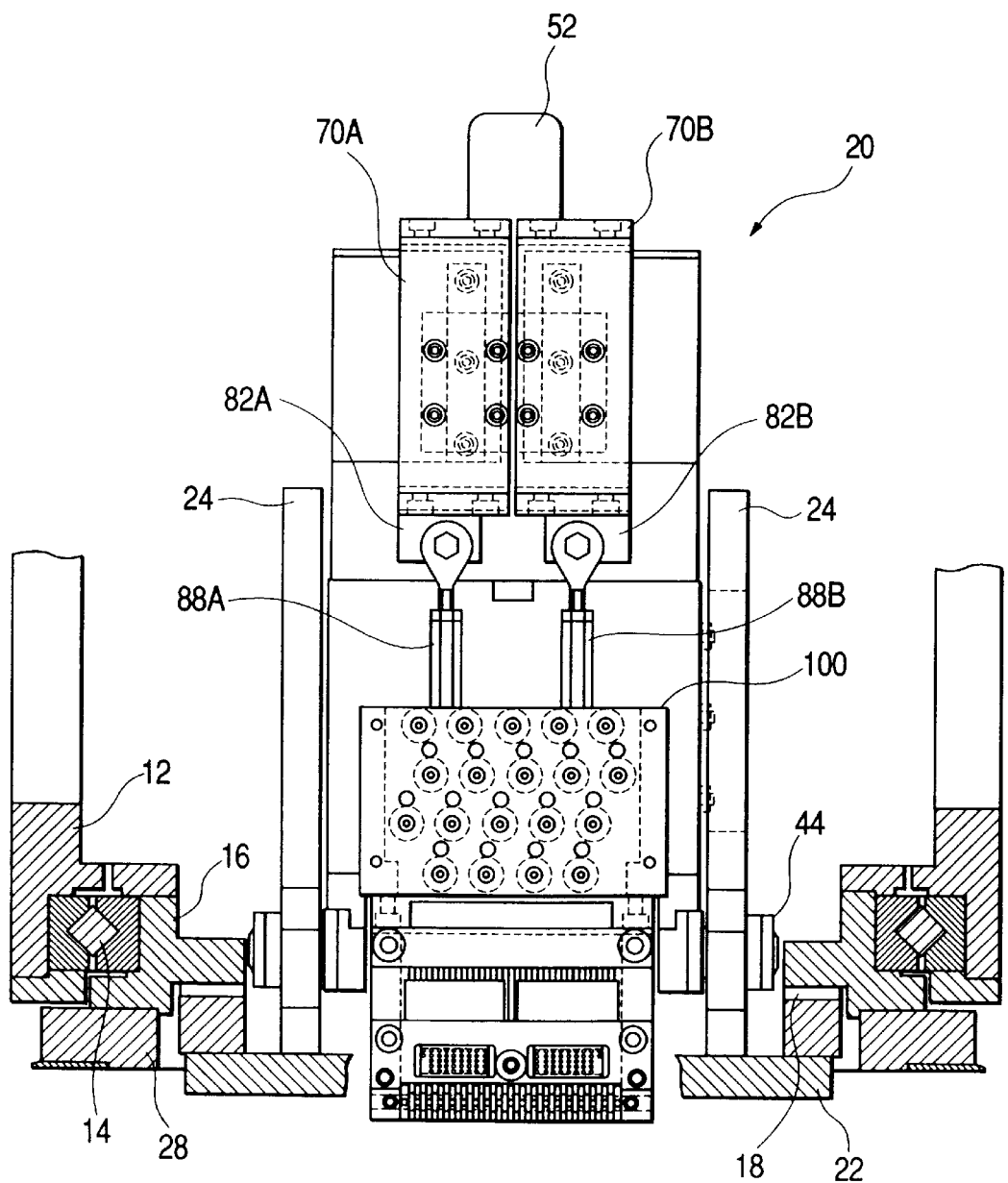
FIG. 3 is a frontal view showing a polishing head and the like in the polishing apparatus of the magnetic head shown in FIG. 1.
Figure 4:
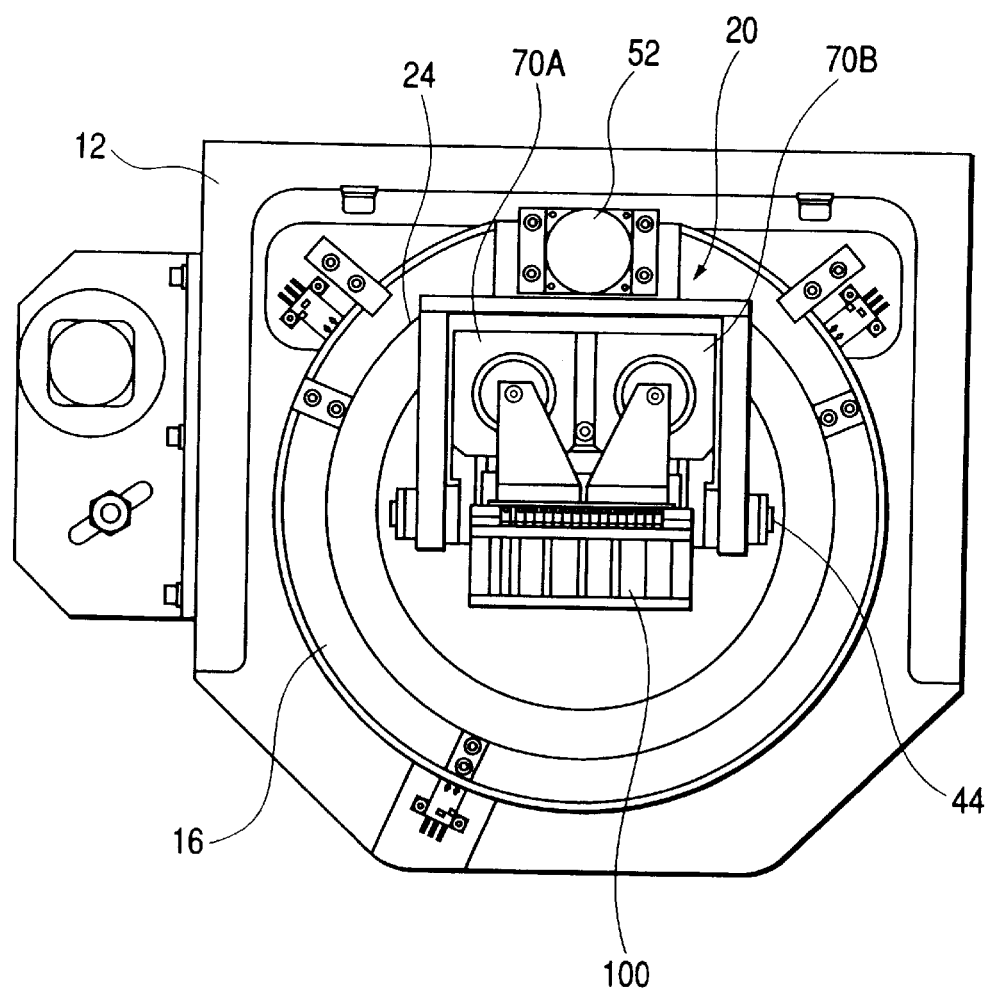
FIG. 4 is a plan view showing the polishing head shown in FIG. 3.

As shown in FIG. 3, a rotary support portion 16 is rotatably supported through an annular bearing portion 14 inside of the polishing head mounting frame 12. A polishing head 20 that is the machining head is mounted on the rotary support portion 16 through a coupling member 18 that is a rigid member. The polishing head 20 has a bottom plate 22 and a vertical support plate 24 fixed and implanted vertically in parallel with each other on the bottom plate 22. As shown in FIGS. 2 and 3, a belt wheel (pulley) 28 is fixed to the rotary support portion 16. A polishing head swinging motor 32 for rotationally driving a belt wheel (pulley) 30 is mounted outside of the polishing head mounting frame 12. A belt 34 is laid around the belt wheels 28 and 30. The motor 32, the belt wheels 28 and 30 and the belt 34 function as a swing means for performing reciprocating rotational motion (swing motion) of the polishing head 20 within a predetermined angular range.

Incidentally, in this embodiment, a rigid member is used as the coupling member 18 and may hold the polishing head 20 stably substantially in the vertical direction to a polishing surface 2a. However, in the case where it is difficult to ensure the polishing head 20 in a stable posture to the polishing surface 2a in a polishing step, it is possible to use an elastic member such as a spring or a rubber as the coupling member and to further use an adjust ring for the purpose of stabilizing the posture of the head.

Figure 7:
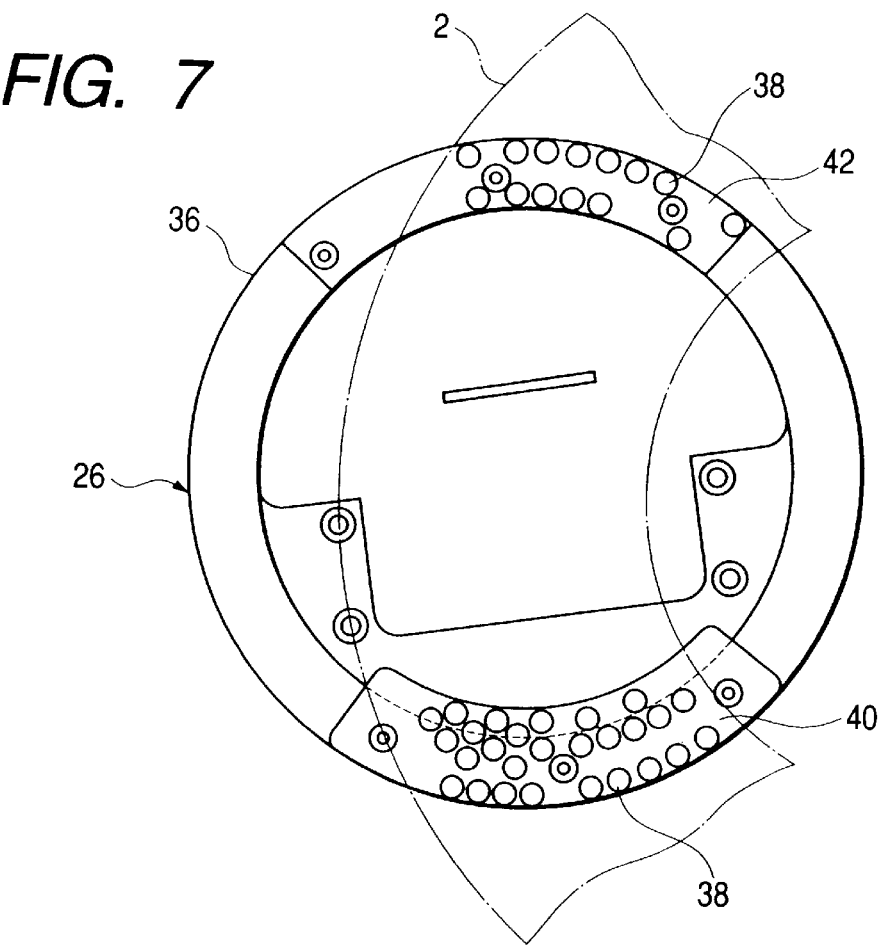
FIG. 7 is a bottom view showing an adjust ring usable in the polishing head according to the invention.

In this case, the adjust ring (wear pad) 26 is fixed to the bottom surface of the bottom plate 22 of the polishing head 20 and is disposed in contact with the polishing surface 2a that is the top surface of the polishing base 2. FIG. 7 is a bottom view showing an example of the adjust ring. As shown in FIG. 7, the adjust ring 26 is one obtained by, for example, embedding a number of cylindrical dummies 38 made of wear-resistive ceramic in an aluminum made ring body 36. The lower end faces of the cylindrical dummies 38 somewhat project from the ring body 36. The number of the cylindrical dummies 38 is selected in conformity with the weight balance of the polishing head 20 to be laid on the adjust ring 26. In case of the adjust ring 26 shown in FIG. 7, since an arcuate portion 40 out of the arcuate portions 40 and 42 of the adjust ring 26 in contact with the polishing base 2 is subjected to more load of the polishing head 20, the number of the cylindrical dummies 38 is increased therefor.

As shown in FIGS. 3 to 6, a slantable shaft 44 in parallel with a lower surface of the polishing base 2 is provided between the portions of the vertical support plate 24 of the polishing head 20. A slantable portion 46 slantable to the polishing head 20 is pivoted about the slantable shaft 44.

Figure 5:
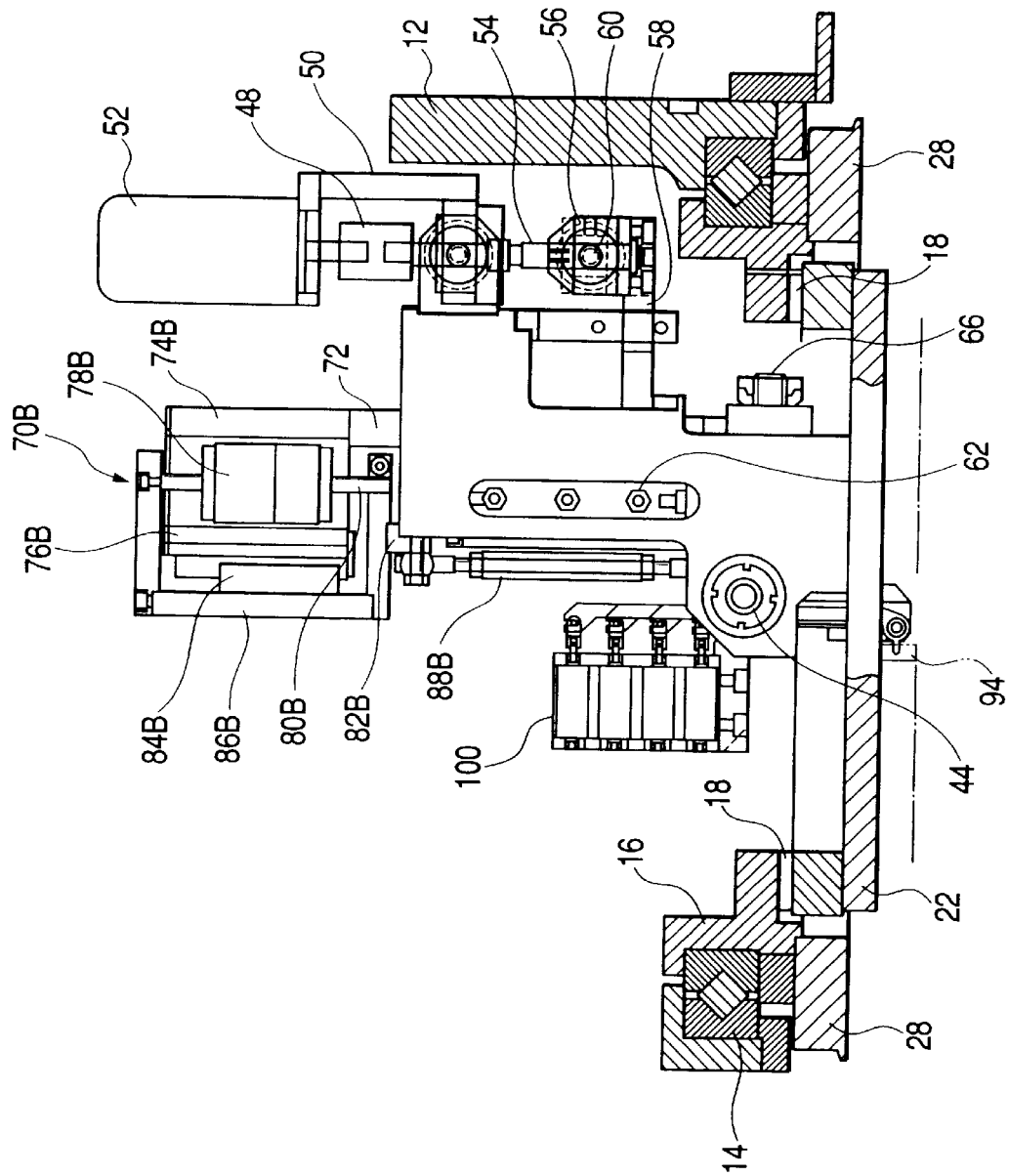
FIG. 5 is a side elevational view showing the polishing head shown in FIG. 3.
Figure 6:
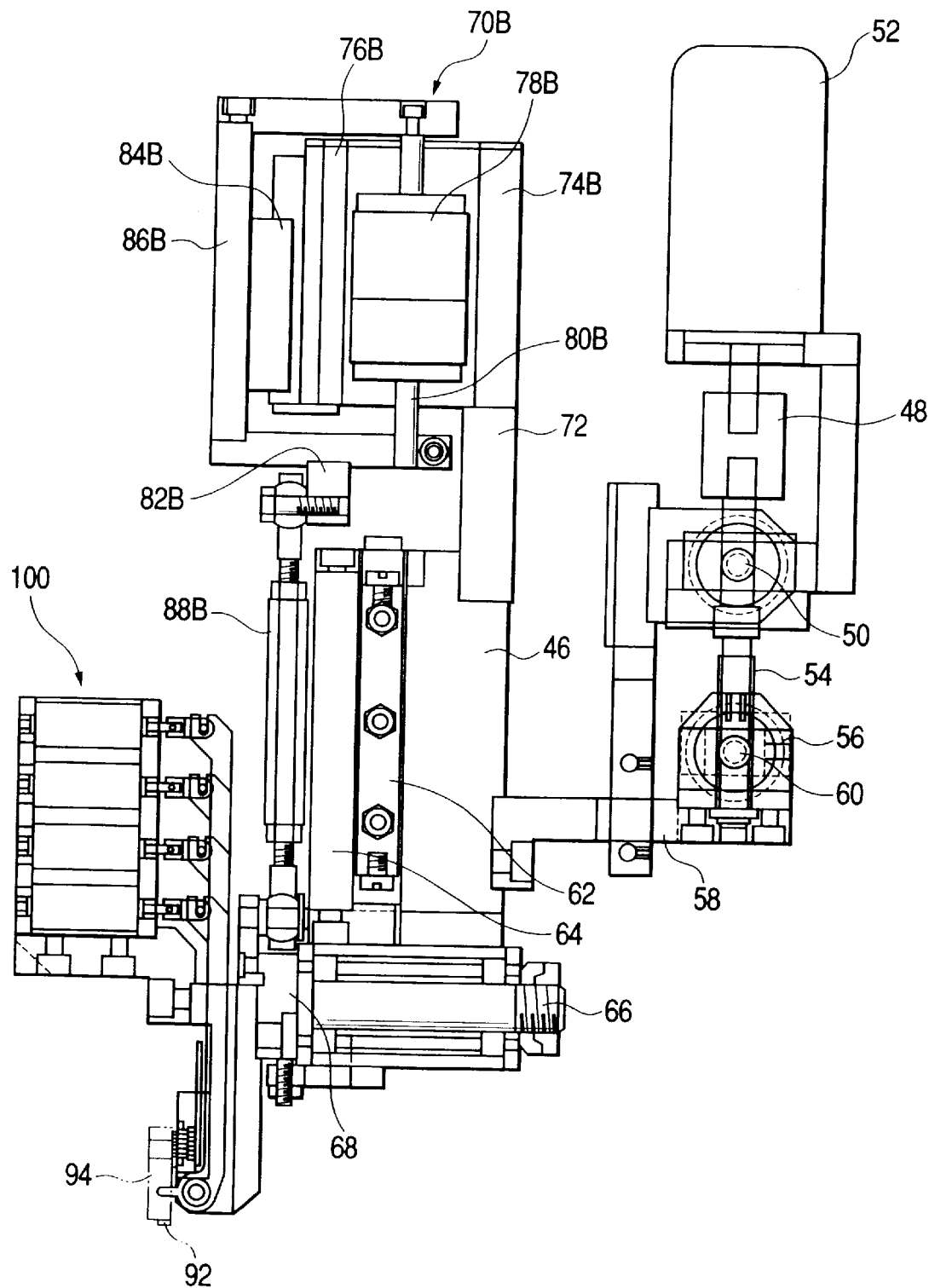
FIG. 6 is a side elevational cross-sectional view showing the polishing head shown in FIG. 3.

As shown in FIGS. 5 and 6, a lower portion of a motor mounting seat portion 48 is mounted rotatably at a pivot shaft 50 in the vertical support plate 24 of the polishing head 20. A slanting motor 52 is fixed to an upper portion of the motor mounting seat portion 48. A ball screw shaft 54 is coupled to a rotary drive shaft of the motor 52. A ball screw nut 56 is engaged with this ball screw shaft 54. One end of an arm 58 that is connected at the other end to the slantable portion 46 is coupled at a pivot shaft 60 to the ball screw nut 56. The mechanism from the pivot shaft 50 to the pivot shaft 60 constitutes a slantable portion driving means for slanting the slantable portion 46 at a predetermined angle from the vertical plane to the polishing surface 2a of the polishing base 2.

An up-and-down moving portion 64 is mounted to be movable up and down to the slantable portion 46 through a slide bearing (cross roller guide) 62 in the slantable portion 46. It should be noted that, since the movement of the up-and-down moving portion 64 is performed together with the slantable portion 46, the slantable portion 46 and the up-and-down moving portion 64 are always kept in a parallel condition. A back plate 68 is pivoted at a pivot shaft 66 perpendicular to the slantable shaft 44 and in parallel with the lower surface of the polishing base 2.

As shown in FIGS. 3 and 5, balancing actuators 70A and 70B are mounted through a bracket 72 on an upper portion of the slantable portion 46. These balancing actuators 70A and 70B are used for lifting upwardly right and left sides of a pivot shaft (a central portion in the longitudinal direction)

of the back plate 68 (application of drawing pressure) and for controlling the load applied to the back plate 68.

The balancing actuators 70A and 70B shown in this embodiment are electromagnetic REC plungers and are composed of frames 74A and 74B, coils 76A and 76B mounted inside the frames 74a and 74B to form the stationary portions, magnets 78A and 78B mounted on central portions of the actuators 70A and 70B to form movable portions and rods 80A and 80B mounted integrally with the centers of the magnets 78A and 78B. Up-and-down moving members 82A and 82B each having an L-shaped cross section are connected to be movable up and down along slide bearing 84A and 84B mounted on the frames 74A and 74B at the lower ends of the rods 80A and 80B. The lower end sides of the up-and-down moving members 82A and 82B and the right side and left side of the back plate 68 are coupled with each other through coupling links 88A and 88B. Here it should be noted that the moving direction of the magnets 78A and 78B and a direction in which a force is applied to the back plate 68 are parallel with each other.

In the actual polishing work, the adjustment of the main depressing load to the polishing surface 2a of an object 92 to be polished is performed by the balancing actuators 70A and 70B. Simultaneously, the adjustment of the rough balance of the depressing load in the longitudinal direction of the object 92 to be polished is performed. In this embodiment, more specifically, a force for drawing the object 92 to be polished mainly upwardly (drawing force) is applied by the actuators 70A and 70B in response to the change in magnitude of the polishing amount and the portion to be polished in the longitudinal direction of the object 92 to be polished. However, it is possible to partially apply the depressing force (force in the direction the object 92 to be polished is depressed against the polishing surface) in response to the necessary polishing amount of each portion.

A correcting mechanism 100 for actually correcting the bend or the like of the object 92 to be polished through a jig 94 upon the polishing work is fixed to the back plate 68 and the correcting mechanism 100 per se is driven by the balancing actuators 70A and 70B. Hereafter, the correcting mechanism 100 will be described in detail.

Figure 8:
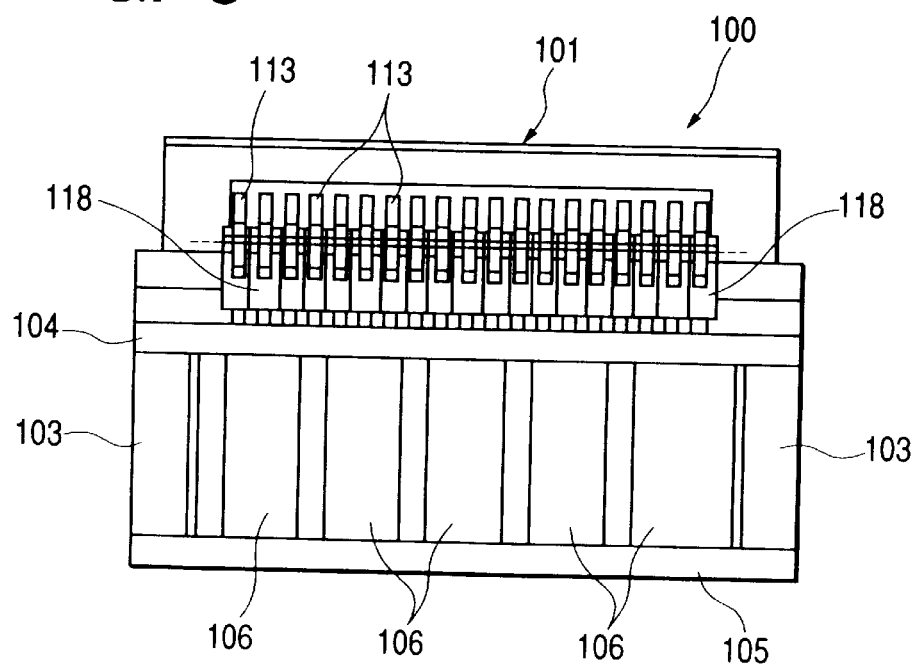
FIG. 8 is a plan view showing a correcting mechanism in accordance with a first embodiment of the invention.
Figure 9:
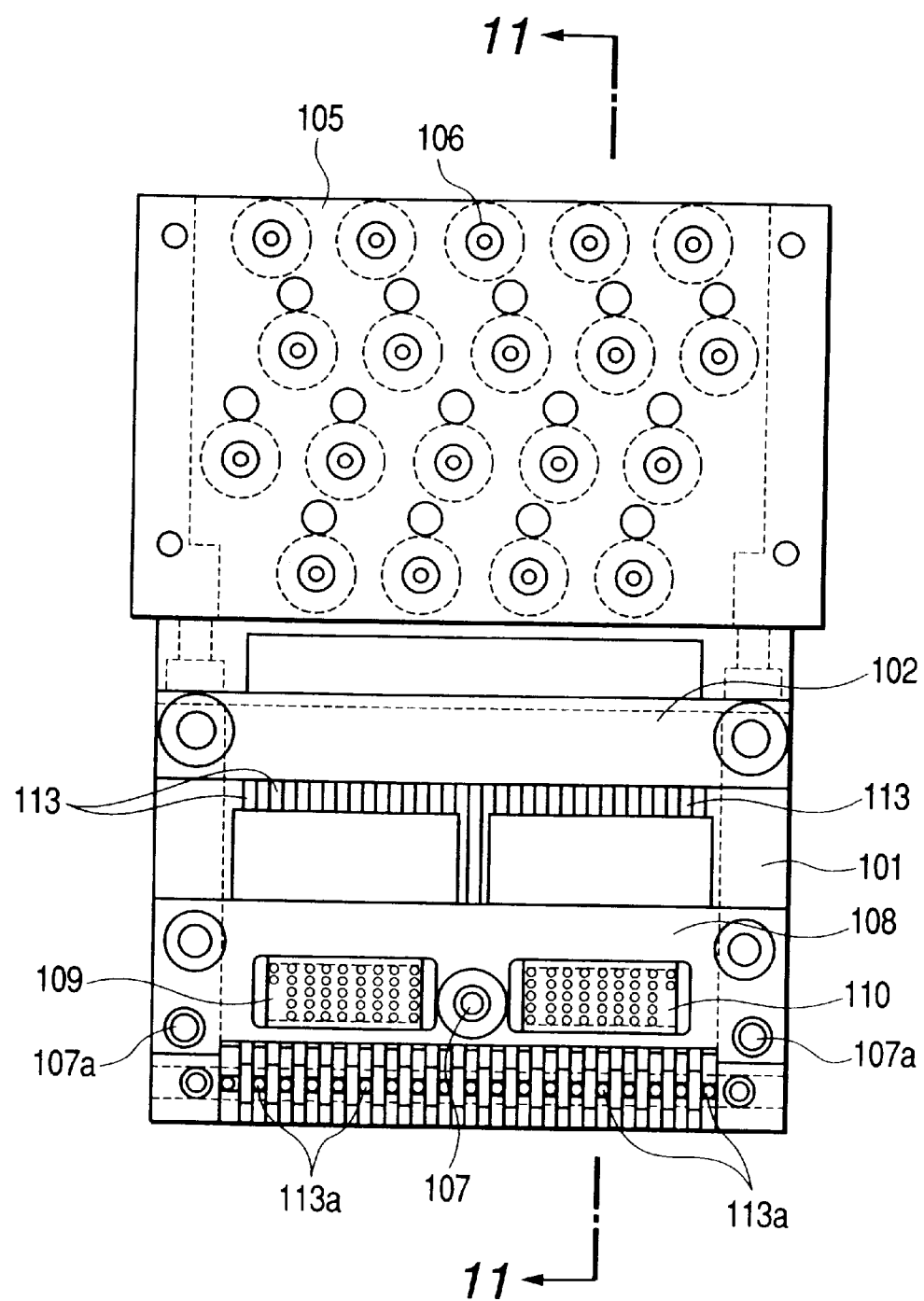
FIG. 9 is a frontal view of the correcting mechanism shown in FIG. 8.
Figure 10:
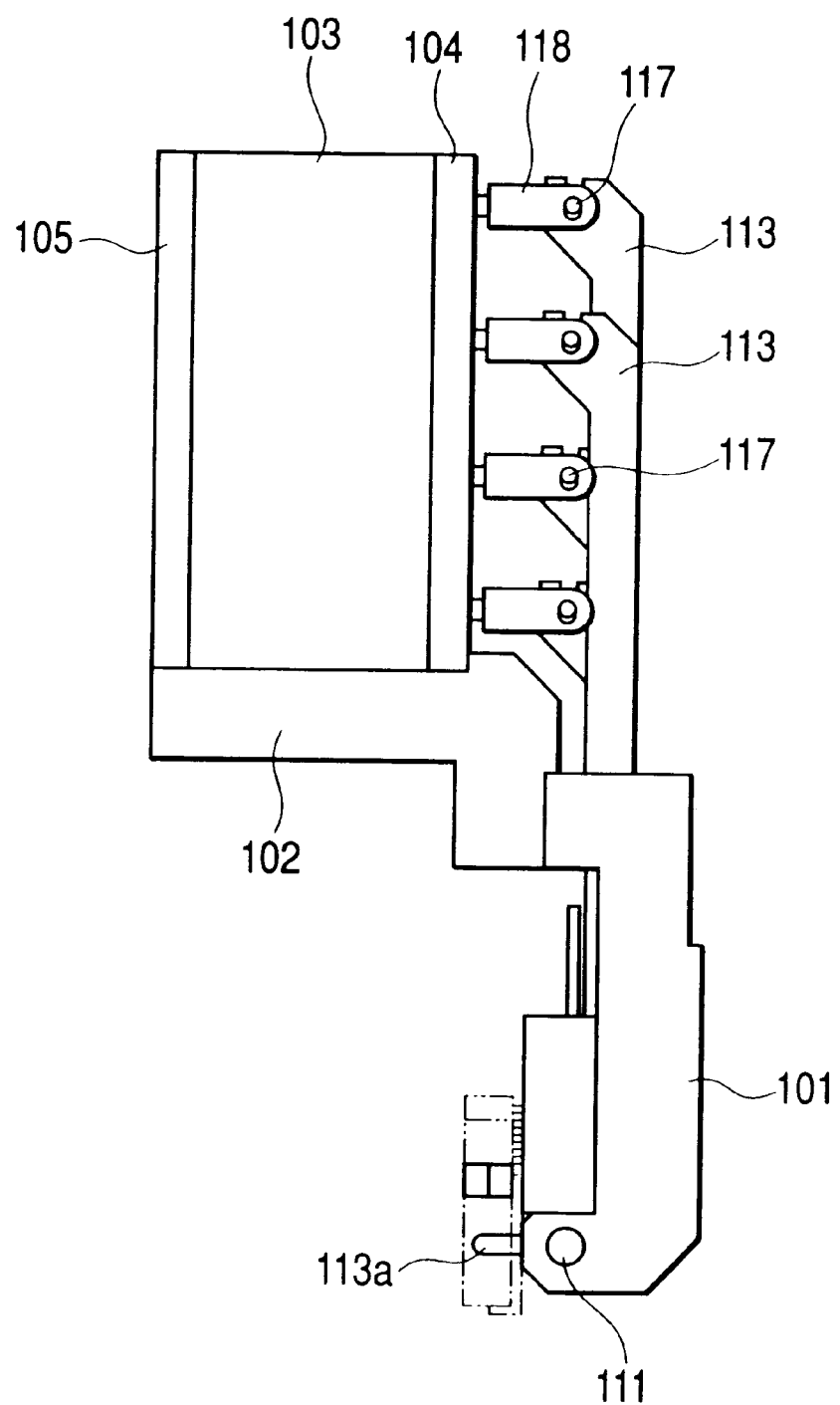
FIG. 10 is a side elevational view of the correcting mechanism shown in FIG. 8.

FIGS. 8, 9 and 10 are a plan view, a frontal view and a side elevational view of the correcting mechanism 100 in accordance with this embodiment, respectively. A base 101 is fixed substantially in parallel with the back plate 68 by means of screws or the like so that the correcting mechanism 100 per se is fixed to the back plate 68. A bracket 103 is fixed through a holder 102 at an upper portion of the base 101. Both side surfaces of the bracket 103 are arranged substantially in parallel with the back plate 68. Plates 104 and 105 are fixed in parallel on both side surfaces of the bracket 103. The bracket 103 is clamped between these two plates so that a correcting actuator 106 composed of a plurality of correcting drive means is held in a predetermined position.

Figure 11:
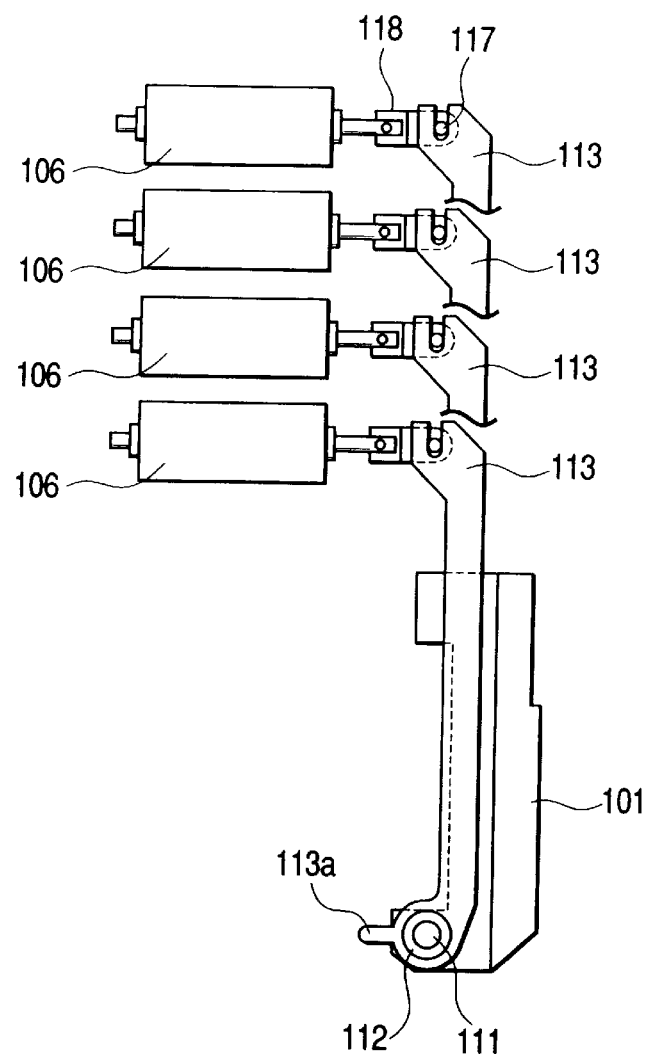
FIG. 11 is a schematic cross-sectional view taken along the line 11—11 of the correcting mechanism shown in FIG. 9.

FIG. 11 is a side elevational view showing the structure of the drive portion of the correcting mechanism 100. As shown in FIG. 11, each correcting actuator 106, at the driving portion thereof, is connected to one end of a lever 113 extending substantially perpendicular to the drive direction through a joint 118 and a pin 117. Furthermore, the lever 113 is rotatably supported through a bearing 112 by a shaft 111 fixed to the base 101 and is rotated about the shaft 111 by the drive of the correcting actuator 106. The lever 113 is provided with a pin 113a at the other end of the coupling portion with the driving portion so as to be rotated about the shaft 111.

In the embodiment, the shaft 111 is provided in the vicinity of the pin 113a for supporting the lever 113 whereby the drive force obtained from the correcting actuator 106 is amplified due to the lever principle and the fine control to the pin 113a may be performed. The tip end of the pin 113a is machined in a spherical shape and is driven in a direction that is substantially perpendicular to the driving direction of the actuator (substantially in the vertical direction of the polishing surface 2a) by the drive of the correcting actuator 106.

Incidentally, since the interval of the adjacent pins 113a is smaller than the size (diameter in this case) of the correcting actuators 106 used in this embodiment, it is impossible to simply arrange the correcting actuators 106 in parallel with each other. Therefore, as shown in FIG. 11, the length of the lever 113 is changed in each case so that the correcting actuators 106 are arranged in a staggered manner to provide the retainer space for the correcting actuators 106. In this case, the drive amounts of the tip ends of the pins 113a are different from each other due to the difference in length of the levers 113. However, according to this embodiment, the respective drive strokes of the correcting actuators 106 are limited to a predetermined range, and simultaneously therewith, the count numbers for measuring the actual drive amounts of the pins 113a are made different from each other to thereby keep constant the drive amounts of the tip ends.

As shown in FIG. 6 or 9, a pair of positioning pins 107a and a fixing pin 107 projecting in a direction opposite the back plate 68 are fixed in parallel with each other at both end portions and the central portion in the longitudinal direction in the lower portion of the base 101. A bracket 108 having probe units 109 and 110 composed of a plurality of resistor measuring terminals 128 or the like is fixed by using the pair of positioning pins 107a. The jig 94 for holding the object 92 to be polished is held so as to clamp the bracket 108 to the base 101 by using both the fixing pin 107 and the positioning pins 107a.

Figure 12:
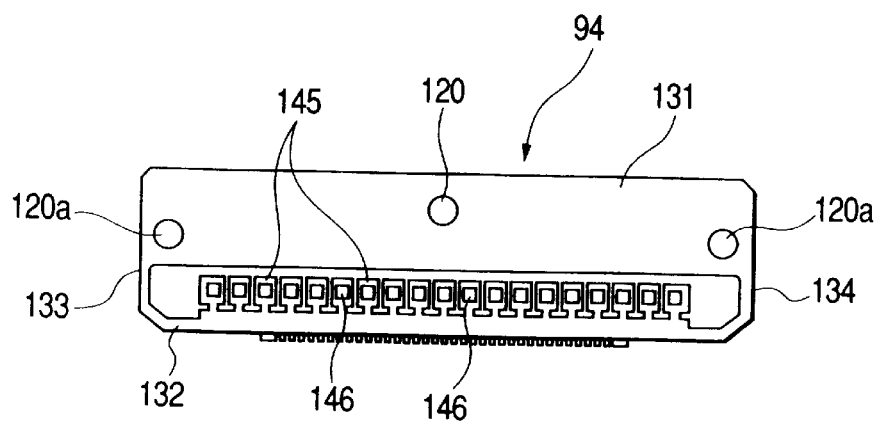
FIG. 12 is a frontal view of a polished object mounting jig used in the embodiment of the invention.

As shown in a frontal view of FIG. 12, for example, the jig 94 is formed in an integral frame shape composed of a body portion 131 elongated in one direction, a holding portion 132 having substantially the same length as that of the body portion 131 disposed in parallel with the body portion 131 and joint portions 133 and 134 for coupling the body portion 131 and the holding portion 132 at both end portions in the longitudinal direction. Holes 120a and 120 through which the positioning pins 107a and the fixing pin 107 pass are provided in the body portion 131, and the body portion 131 is fixed to the base 101. In the holding portion 132, a plurality of load receiving portions 145 are arranged in the longitudinal direction on the portion of the inside of the frame and the holding portion 132 holds the object 92 to be polished on the portion of the outside of the frame.

A load receiving hole 146 is formed in a central portion of each load receiving portion 145. When the jig 94 is fixed to the base 101, a spherical portion at the tip end of the pin 113a is inserted into the load receiving hole 146. In accordance with the drive of the correcting actuator 106, the tip end portion of the pin 113a depresses the peripheral portion of the load receiving hole 146 to drive the load receiving portion 145 up and down. In accordance with the movement of this load receiving portion 145, the holding portion 132 is partially deformed and simultaneously, the portion 92 to be polished is locally deformed.

Incidentally, the tip end portion of the pin 113a is not moved up and down in a linear manner but is moved up and down while depicting an arcuate locus in accordance with the arcuate rotation of the lever 113 about shaft 11. For this reason, in the embodiment, the tip end portion is made spherical so that the tip end portion may slide to the peripheral portion of the load receiving hole 146 to enable the smooth slide of the load receiving portion 145 with respect to the tip end portion.

In the object 92 to be polished to be fixed to the holding portion body 132, element portions of a number of magnetic heads made of magnetic thin film pattern are arranged in a single line on the elongated rectangular ceramic bar (to be divided into elements for sliders of the thin film magnetic head). The magnetic thin film pattern of these element portions is arranged on one side longitudinal surface of the ceramic bar. Accordingly, the bottom surface of the ceramic bar is polished so that the throat height and the MR height may be reduced in the element portion formed on the above-described longitudinal side surface.

As described above, the strain, the distortion or the like is present in the object 92 to be polished. When the object 92 is to be polished, it is necessary to polish it after correcting the strain or the like. In this embodiment, the amount of bend deformation that is needed in each position in the longitudinal direction of the object 92 to be polished is corrected by driving up and down each load receiving portion 145 formed in the lateral longitudinal jig 94 by the necessary amount.

Accordingly, upon the polishing work, it is necessary to seek the necessary drive amount of the loading receiving portion 145, i.e., the amount of bend deformation of the object 92 to be polished. A specific example for seeking the necessary amount of deformation during polishing work and driving the correcting actuator 106 on the basis of the sought value will now be described. In the embodiment, additional electrodes are provided on the longitudinal side surface of the ceramic bar in addition to the elements. The additional electrodes reduce the size of the ceramic bar in accordance with the polishing work of the ceramic bar and increase the resistance value. In the embodiment of the invention, the polishing work according to a so-called closed loop control in which the change of the resistance value of the additional electrodes is monitored and the polishing amount at the monitoring time is sought to thereby seek the further necessary amount of deformation on the basis of the obtained polishing amount is performed to control the polishing amount in the object 92 to be polished.

For this reason, the electrodes electrically connected to the additional electrodes by wire bonding are formed in advance on a surface, on the confronting side to the bracket 108, of the lateral longitudinal jig 94. Measurement pins 128 biased by spring or the like are implanted in the probe units 109 and 110 on the bracket 108. When the lateral longitudinal jig 94 is fixed to the base 101, the above-described electrodes and the measurement pins 128 are brought into contact with each other. Furthermore, the measurement pins 128 are connected to the resistance value measurement means (not shown), and the lateral longitudinal jig 94 is fixed to the base 101 to thereby make it possible to measure the resistance value of the additional electrodes.

Figure 13:
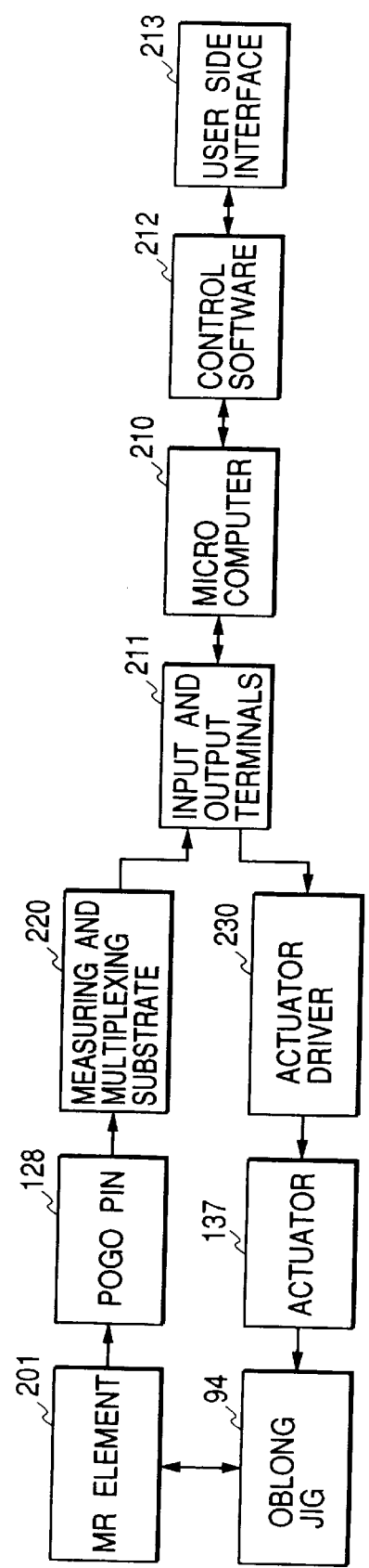
FIG. 13 is a block diagram in conjunction with a polishing amount control in accordance with the embodiment of the invention.
Figure 14:
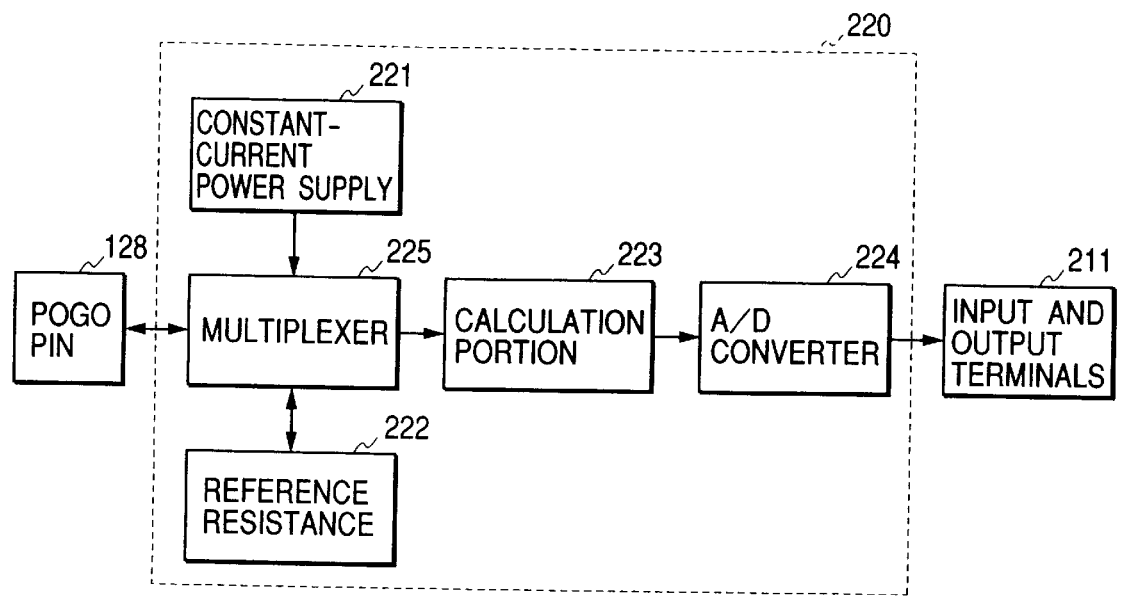
FIG. 14 is a diagram showing detail of the measurement and a multiplex substrate shown in FIG. 13.
Figure 15:
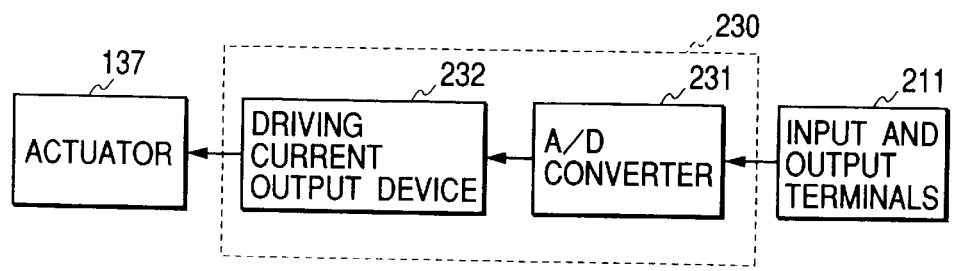
FIG. 15 is a view showing a detail of a micro actuator driving substrate shown in FIG. 13.

The structure of the specific resistance value measurement means and the control means of the actuator 106 will now be described. FIG. 13 is a control block diagram for driving the correcting actuator 106 on the basis of the resistance value of the measured additional electrodes including the above-described measurement means and control means. FIG. 14 is a detailed block diagram of a measurement and multiplex substrate 220. FIG. 15 is a detailed block diagram of the actuator drive substrate. Incidentally, in the embodiment, since the resistance value is measured in accordance with a four-terminal method, a plurality of measurement pins 128 are brought into contact with a single additional electrode 201.

The voltage obtained by the additional electrode 201 through the measurement pins 128 with the measurement and multiplex substrate 220 is converted into resistance values on the basis of the calculation used in a well known four-terminal measurement. Furthermore, these values are converted and multiplexed as digital data and inputted into an input/output terminal 211 of a microcomputer 210. Furthermore, using the data inputted in the computer 210, the polishing amount of the object 92 to be polished is calculated to display the polishing amount to the operator.

The above-described signal processing from the measurement of the resistance values to the output of the digital data will now be described in detail with reference to FIG. 13. In the measurement and multiplex substrate 220, the supply of current from a constant current power source 221 to the plurality of measurement pins 128, the measurement of voltage between the respective pins, and, in a calculation portion 223, the numerical calculation on the basis of the comparison of the value of a correcting resistance 222 with the measurement value are continuously performed to obtain the resistance value of the additional electrode. The obtained value is converted into digital data by an A/D converter 224.

The necessary polishing amount of the portion where the measured additional electrode on a surface 92a to be polished and the amount of vicinity thereof is formed and sought. Subsequently, in order to perform the polishing work with the necessary amount, the drive amount needed for each load receiving portion 145 is sought as drive amount data in the computer 210. The drive amount data is inputted into an actuator drive substrate 230 through the input terminal 211 from the computer 210.

The data is converted into a control signal in the actuator drive substrate 230. The drive current is outputted to each correcting actuator 106 from a drive current output device 232 that has received the control signal. In response to the output, each correcting actuator 106 finely adjusts the amount of deformation given to the object 92 to be polished by the drive of the load receiving portion 145 of the lateral longitudinal jig 94 to thereby finely adjust the load balance of the polishing amount of the object 92 in each position in the longitudinal direction with respect to the polishing surface 2a.

As described above, the correcting actuator 106 is controlled through the closed loop so that the object may be polished while monitoring the polishing amount to cope with the case where the allowable range of the non-uniformity of the polishing amount becomes narrower. Incidentally, it is possible to seek the polishing amount from the resistance of the actual elements, for example, the MR value without using the additional electrode.

The operation of the actual apparatus and the polishing method in accordance with the embodiment of this invention will now be described. First of all, in a position where the polishing head 20 shown in FIGS. 1 and 2 is out of the polishing base 2, the lateral longitudinal jig 94 holding the object 92 to be polished where a plurality of elements for the thin film magnetic heads are arranged is fixed to the base 101 by using the fixing pin 107 and the positioning pins 107a. At that time, the additional electrode and electrodes provided on the side surface 94a of the lateral longitudinal jig 94 have already been wire bonded and the measurement pin 128 is brought into contact with the above-described electrode.

All the tip end portion of the pin 113a of each lever 113 is inserted into the load receiving hole 146 of the jig 94. Thereafter, the slant angle of the back plate 68 with respect to the polishing head 20 is set at zero in the initial stage (in the case where the adjust ring is used, in a vertical position to the bottom surface of the adjust ring 26, i.e., the vertical posture to the polishing base 2).

Here, depending upon the structure of the object to be polished, in the case where, for example, the elements and the like are built in the arrangement on the object to be polished that needs a very large polishing amount to obtain a predetermined throat height, there are some cases where a rough polishing work is performed in advance by another apparatus before the above-described mounting work. In this embodiment, in this case, this rough polishing is not performed under the condition that the object 92 to be polished is held in the lateral longitudinal jig 94 but the rough polishing is performed under the condition that the object 92 to be polished is fixed to another jig (not shown). However, the rough polishing may be performed by using the lateral longitudinal jig 94. After the completion of the rough polishing, the object 92 to be polished is removed away from the another jig and is again fixed to the lateral longitudinal jig 94.

After the mounting work of the lateral longitudinal jig 94 and the slant angle setting of the back plate 68, the polishing head mounting frame 12 on which the polishing head 20 is mounted is moved in a linear manner along the guide rails 8 and positioned above the polishing base 2 that is rotationally driven. Furthermore, in order to bring the object 92 to be polished into contact with the polishing surface 2a on the top surface of the polishing base 2, the polishing head mounting frame 12 is lowered. When the adjust ring 26 is used, the polishing head mounting frame 12 is lowered so that a part of the lower surface of the plurality of cylindrical dummies 38 embedded in the lower surface thereof is brought into contact with the polishing surface 2a of the top surface of the polishing base 2 and the part is kept in contact therewith at a suitable pressure.

Furthermore, the balancing actuators 70A and 70B are driven so that each parallel pressure force applied to the left side and the right side of the back plate 68 is adjusted and the object 92 to be polished is kept under the condition that object 92 to be polished is depressed substantially in parallel and against to the polishing surface 2a. In this embodiment, the main pressure is obtained from the balancing actuators 70A and 70B. However, in this stage, the pressure to such an extent that the back plate 68 is supported is applied so as to keep the right and left balancing actuators 70A and 70B under the condition that both end portions of the object 92 to be polished is in contact with the polishing surface 2a. Incidentally, this adjustment may be performed by visual observation or may be performed by using a contact sensor or the like. Also, it is possible to roughly measure, in advance, the bend of the object 92 to be polished and to adjust the balance of the pressure by the balancing actuators 70A and 70B so as to correct the bend in response to the measurement result.

Under this condition, the polishing of the object 92 to be polished is executed. The measurement of the polishing amount in accordance with the resistance value measurement of the additional electrode is performed at each desired timing to obtain the necessary polishing amount in each additional electrode formation position at a desired interval in the polishing step. Each correcting actuator 106, i.e., the drive amount of the load receiving portion 145 is controlled in response to the obtained necessary polishing amount to make it possible to obtain the desired throat height or the like. Incidentally, in the case where the bend of the object to be polished is remarkable and simple like an arcuate shape and the distribution of the necessary polishing amount is remarkable, it is preferable to first perform the adjustment of the balance of the deformation amount by the balancing actuators 70A and 70B and thereafter to perform the drive amount adjustment of the correcting actuators.

Incidentally, in the case where the adjust ring is used, since, during the polishing step, the local wear is likely to occur if the same place of the adjust ring 26 is in contact with the polishing base 2, the rotary support portion 16 on which the polishing head 20 and the adjust ring 26 are mounted is reciprocatingly rotated within a predetermined angular range by the polishing head swinging motor 32, and the polishing head mounting frame 12 is reciprocatingly moved in a linear manner in a predetermined range. Accordingly, during the polishing step, the polishing head 20 and the adjust ring 26 take the composite motion of the reciprocating rotational motion and the reciprocating linear motion.

According to the above-described method, the bend of the ceramic bar that is the object to be polished may be corrected in more detail and may be polished so that the values of the throat height or the like may fall within the allowable range over the full length of the ceramic bar.

Incidentally, in this embodiment, the polishing head having the REC plungers as the balancing actuators 70A and 70B is used. However, the balancing actuators are not limited thereto or thereby, and it is possible to use a variety of kinds of low frictional cylinder such as an electromagnetic one. Also, in this embodiment, two actuators are used to compensate for the insufficiency of the drive stroke of the correcting actuators 106. However, in order to more effectively compensate for the drive stroke of the correcting actuators, it is possible to increase the number of the balancing actuators. Also, in the case where the drive stroke of the correcting actuator 106 per se is sufficiently large, it is possible to dispense with the balancing actuators and to take the structure that has only the single drawing or depressing actuator.

Furthermore, in this embodiment, the REC plungers are used as the correcting actuators. However, the application of the present invention is not limited to this embodiment. It is possible to take a structure that has a pneumatic or electromagnetic cylinder or the like. Also, in this embodiment, the shaft 111 supports the levers 113 in the vicinity of the pins 113a. The application of the invention is not limited to this embodiment. It is possible take a variety of arrangements such as the arrangement where the shaft is located, for example, in the vicinity of the correcting actuators 106 in view of the drive stroke and the drive load of the correcting actuators 106 and the pins 113a. Also, the mounting position of the correcting actuators 106 to the plates 104 and 105 and the length of the levers 113 are not limited to those shown in this embodiment. It is preferable that these factors are selected in accordance with the size of the actuators 106 and the interval of the adjacent pins 113a.

Also, the control in accordance with the closed loop of the embodiment is performed only by means of each correcting or micro actuator. However, in some possible cases, the necessary polishing amount obtained exceeds the drive range of the micro actuator, for example. For these cases, in the case where the obtained necessary polishing amount is greater than a predetermined value, the bend correction of the object to be polished only by the balancing actuators 70A and 70B at one end is performed and the operation goes into the subroutine for reducing the necessary polishing amount at first. It is possible to take the structure for performing the micro actuator in accordance with the closed loop thereafter.

Also, in this embodiment, the fixture of the object 92 to be polished to the lateral longitudinal jig 94 or the transfer jig, and the fixture of the transfer jig to the lateral longitudinal jig 94 are performed by thermoplastic adhesives. However, this invention is not limited thereto. It is possible to adopt the fixture with thermosetting or any other kind of adhesives, viscous material made of resin or the like, electrostatic adhesion, vacuum suction or the like.

Also, in the foregoing embodiment, only the polishing work has been described. It is obvious for those skilled in the art to apply the present invention not only to the polishing work but also the grinding work or any other suitable work. Furthermore, the present invention is not limited to the specific manners in the foregoing embodiment but it is possible for those skilled artisan to variously modify or change the invention within the scope of the appended claims.

(Second Embodiment)

A polishing apparatus for a magnetic head in accordance with a second embodiment of this invention will now be described with reference to the accompanying drawings. Incidentally, since the difference between the first embodiment and the second embodiment is only the structure of the bend correcting mechanism 100 and the bend correcting mechanism 200, the duplicated description as to the portions except for the correcting mechanisms 100 and 200, the control blocks for detecting the necessary polishing amount of the object 92 to be polished or the like in the overall structure of the apparatus will be omitted. The correcting mechanism 200 in accordance with the second embodiment of this invention will now be described in detail.

Figure 16:
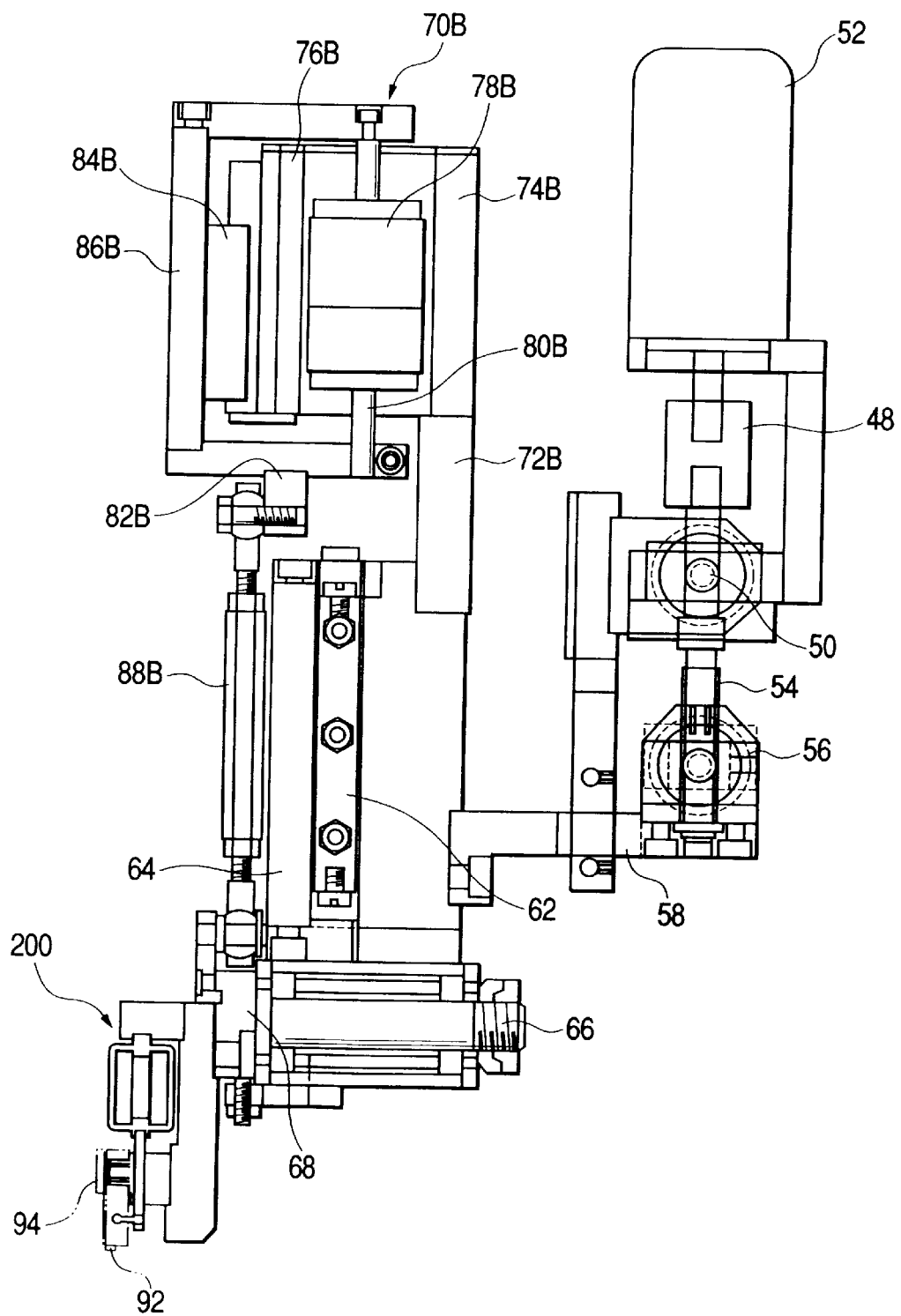
FIG. 16 is a side elevational cross-sectional view of a polishing head according to a second embodiment of the invention.
Figure 17:
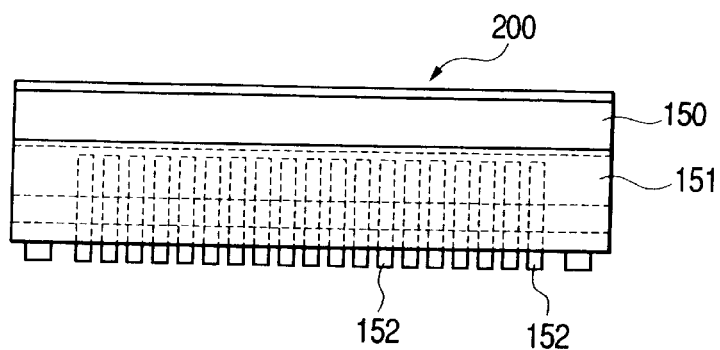
FIG. 17 is a plan view of a correcting mechanism in accordance with the second embodiment of the present invention.
Figure 18:
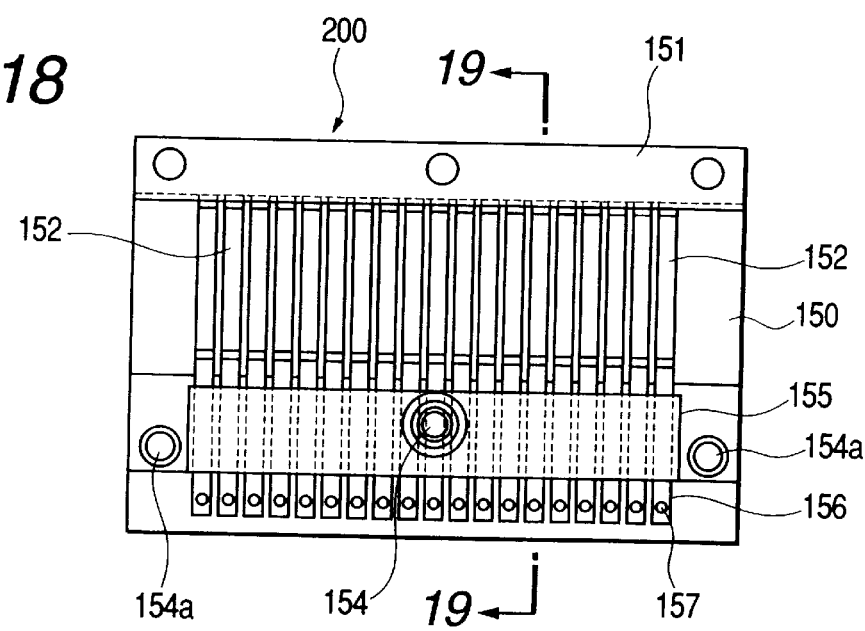
FIG. 18 is a frontal view of the correcting mechanism shown in FIG. 17.
Figure 19:
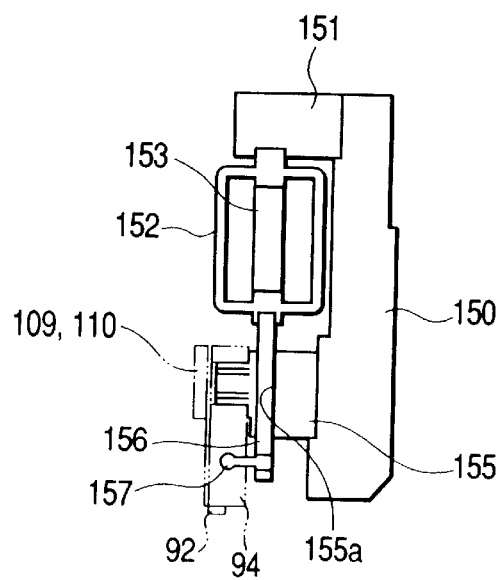
FIG. 19 is a schematic cross-sectional view taken along the line 19—19 of the correcting mechanism shown in FIG. 18.

FIG. 16 is a side elevational view of the polishing head according to this embodiment. FIGS. 17, 18 and 19 are a plan view, a frontal view and a side elevational view of the correcting mechanism 200 in accordance with this embodiment, respectively. The correcting mechanism 200 in accordance with this embodiment is composed of a base 150, a holder 151, an actuator holder 152 that is a frame-like member, a correcting actuator 153 that is a correcting drive means, a fixing pin 154, positioning pins 154a, a guide bracket 155, shafts 156 and pins 157. The base 150 is fixed substantially in parallel to the back plate 68 by fastening means such as screws. With this means, the correcting mechanism 200 per se is fixed to the back plate 68.

The holder 151 is fixed to the upper portion of the base 150. The holder 151 holds a plurality of actuator holders 152 substantially in parallel to the back plate 68. Each actuator holder 152 has the frame-like shape. The actuator holder 152 holds the correcting actuator 153 so as to be drivable in the same direction as the drive direction of the balancing actuators 70A and 70B. The actuator holder 152 is made of material that may be flexed and is driven to expand or contract in the drive direction of the correcting actuator in response to the expansion or contraction of the correcting actuator 152. The actuator holder 152 is fixed to the holder 151 substantially immediately above the correcting actuator 153, and holds one end of the shaft 156 extending in the drive direction of the correcting actuator 153 substantially immediately below the correcting actuator.

The fixing pin 154 for fixing the jig 94 holding the guide bracket 155 and the object 92 to be polished and the positioning pins 154a for defining the fixture position are fixed to the lower portion of the base 150. The above-described shaft 156 passes through each guide hole 155a provided in the guide bracket 155. Thus, the vertical drive of the shaft 156 in accordance with the correcting actuator 153 is prevented from being displaced out of the drive direction by the guide hole 155a. Each pin 157 extending in the opposite direction to the base 150 is provided at the other end of the shaft 156. In this embodiment, the tip end of the pin 157 is machined into a spherical shape. The tip end is driven in a direction substantially in parallel with the drive direction of the actuator (substantially perpendicular to the polishing surface 2a) by the drive of the correcting actuator 153.

As shown by dotted lines in FIG. 19, the jig 94 holding the object 92 to be polished positions so as to clamp the bracket 155 by the base 150 and the jig 94 by using the positioning pins 154a and is fixed and held by using the fixing pin 154. Incidentally, in this embodiment, since it is impossible to obtain the sufficient number of the contact points to the resistance measurement terminals 128 due to the work for the guide holes 155a or the like, the probe units 109 and 110 made of a plurality of resistance measurement terminals 128 or the like are not provided directly to the guide bracket 155. For this reason, unlike the first embodiment, the probe units 109 and 110 are discrete units from the guide bracket 155 that may be removed. The guide bracket 155 is fixed by using the fixing pin 154 to the opposite surface to the facing surface to the guide bracket 155 of the jig 94.

It is possible to use the jig 94 as exemplified in the first embodiment except that the surface thereof where the electrodes electrically connected to the additional electrode by wire bonding is formed in advance, is the opposite surface to the facing surface of the guide bracket 155. Namely, when the jig 94 is fixed to the base 150, the spherical portion at the tip end of the pin 157 is inserted into the load receiving hole 146. According to the drive of the correcting actuator 153, the tip end portion of the pin 157 depresses the circumferential portion of the load receiving hole 146 to drive the loading receiving portion 145 up and down. The movement of the load receiving portion 145 deforms partially the holding portion 132 and simultaneously gives a local deformation also to the object 92 to be polished.

Incidentally, since the interval between the tip end portions of the adjacent pins 157 is large in comparison with the size of the correcting actuator 153 used in this embodiment (in this case, the cross-sectional area in the direction perpendicular to the expansion/contraction drive direction), it is possible to arrange simply the correcting actuators 153 in parallel with each other. However, in the case where it is necessary to reduce the interval between the pin tip end portions in comparison with the size of the correcting actuators 153, it is possible to arrange the respective correcting actuators 153 in a staggered manner and to provide a holding space for each correcting actuator 153.

Also, in this embodiment, each actuator holder 152 has the frame-like shape (frame). The correcting actuator 153 and the shaft 156 are arranged on a centerline thereof, and are held on the centerline to the holder 151. However, the arrangement of the present invention is not limited thereto. If the rigidity of the correcting actuator may be compensated for, it is possible to take a variety of shapes such as a U-shape, for example, for the shape of the actuator holder. Furthermore, in the case where the rigidity of the correcting actuator per se is high, it is possible to take a structure for removing the actuator holder. Also, in the foregoing embodiment, it is possible to displace the pins in view of the moment to be applied to the tip end of each pin or the like.

Also, in the embodiment, a piezoelectric actuator is used as the correcting actuator 153. However, the correcting actuator is not limited thereto. Also with respect to the arrangement of the probe units 109 and 110, it is possible to take the same arrangement as that of the first embodiment in response to the number of the contact points with the available resistance measurement terminal 128. Furthermore, the modifications or the like of each structure described in conjunction of the mode of the first embodiment such as the modification of the structure of the balancing actuators may be applied to this embodiment in the same manner.

(Third Embodiment)

In the second embodiment, the tip end portion of each pin 157 is moved up and down in a linear manner in response to the deformation of the correcting actuator 153. For this reason, in the second embodiment, the drive amount of the correcting actuator 153 is small in comparison with the first embodiment, and, in addition, the piezoelectric element is used as each actuator so that a large deformation force may be given to the holder 152 with high precision, advantageously. However, since the piezoelectric elements that have a relatively small amount of deformation are used, there is a fear that the deformation amount to be given would be insufficient. Therefore, in accordance with the third embodiment, air cylinders are used as the correcting actuators.

A polishing apparatus for a magnetic head in accordance with a third embodiment of this invention will now be described with reference to the accompanying drawings. Incidentally, since the difference between the first embodiment and the third embodiment is the structure of the bend correcting mechanism 100 and the bend correcting mechanism 300, the duplicated description as to the portions except for the correcting mechanism 300, the control blocks for detecting the necessary polishing amount of the object 92 to be polished or the like in the overall structure of the apparatus will be omitted. The correcting mechanism 300 in accordance with the third embodiment of this invention will now be described in detail.

Figure 20:
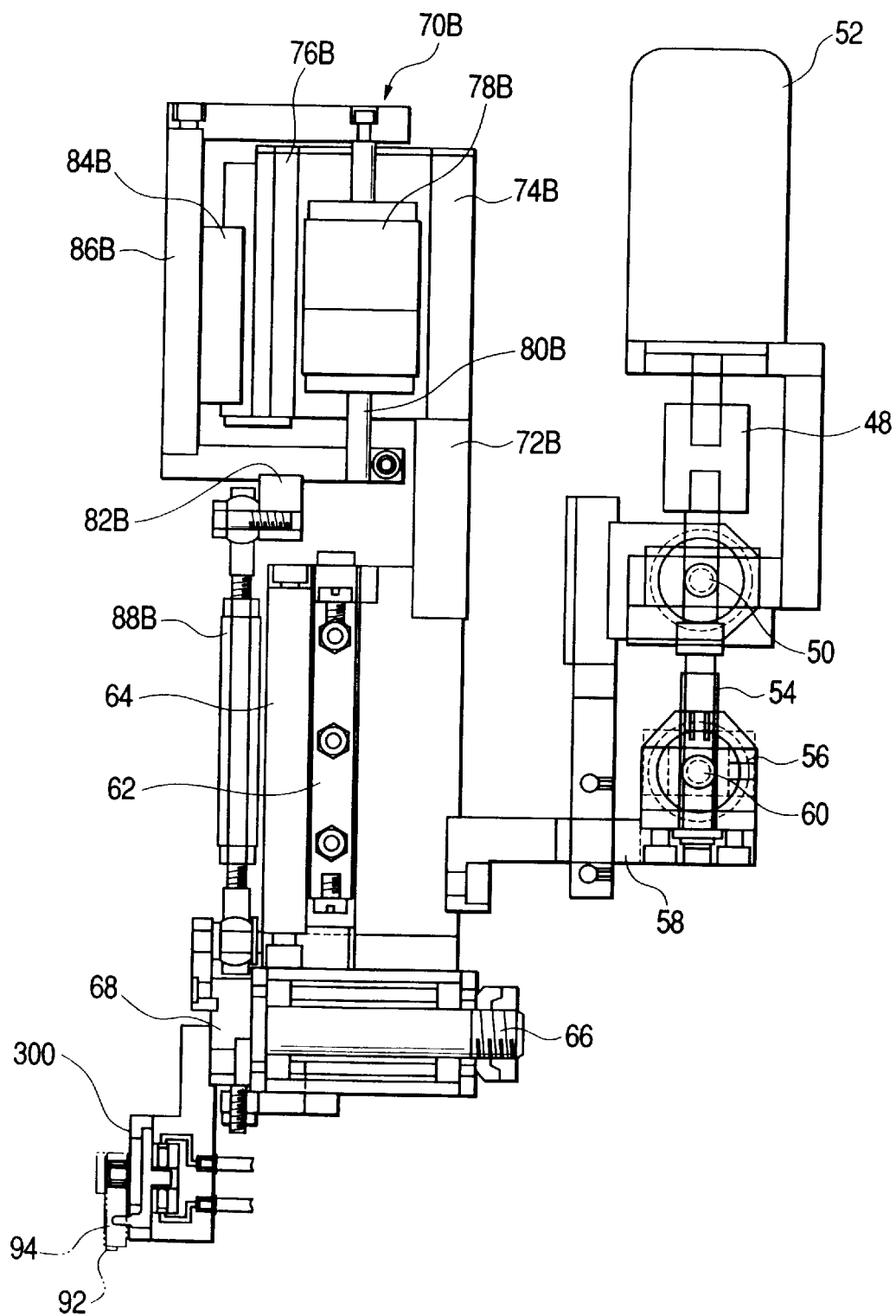
FIG. 20 is a side elevational cross-sectional view of a polishing head according to a third embodiment of the invention.
Figure 21:
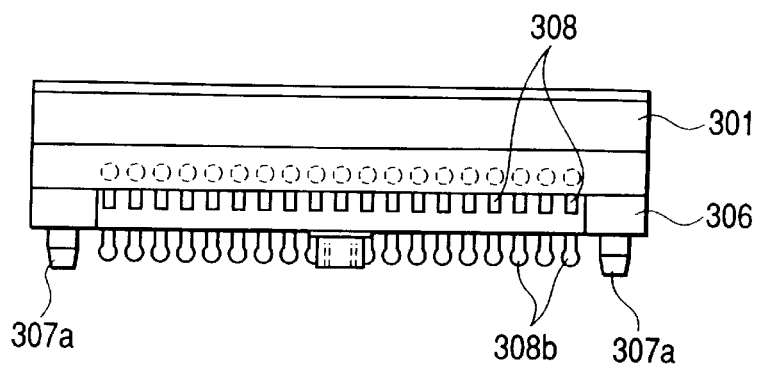
FIG. 21 is a plan view of a correcting mechanism in accordance with the third embodiment of the present invention.
Figure 22:
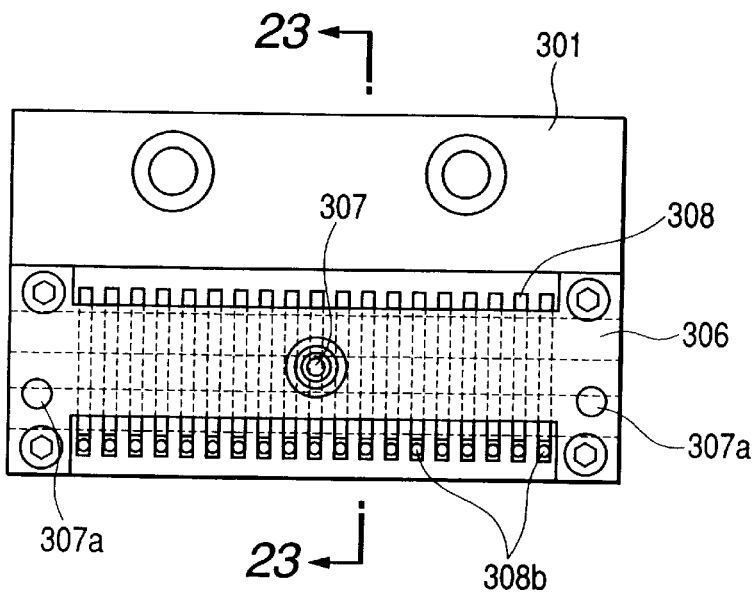
FIG. 22 is a frontal view of the correcting mechanism shown in FIG. 21.
Figure 23:
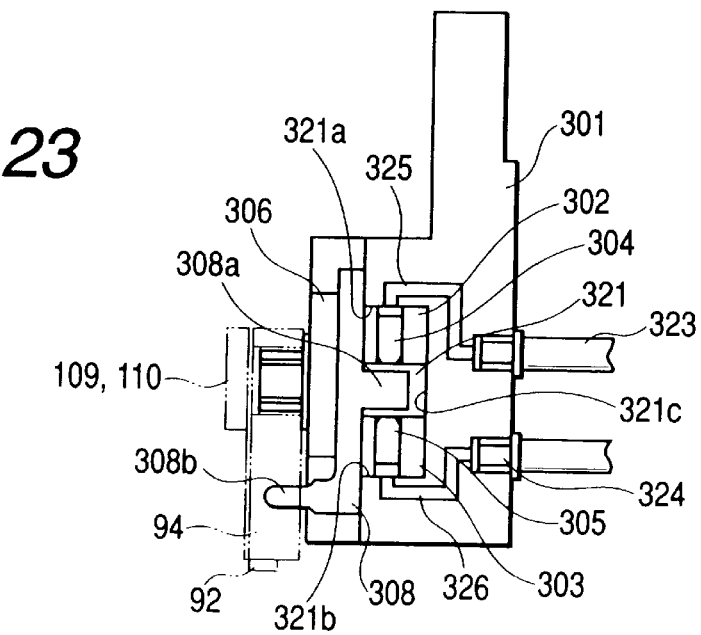
FIG. 23 is a schematic cross-sectional view taken along the line 23—23 of the correcting mechanism shown in FIG. 22.

FIG. 20 is a side elevational view of the polishing head according to this embodiment. FIGS. 21, 22 and 23 are a plan view, a frontal view and a cross-sectional view taken along the line 23—23 of FIG. 22, respectively. The correcting mechanism 300 in accordance with this embodiment is composed of a base 301, cylinder syringes 302, 303, piston 304, 305, a guide bracket 306, a fixing pin 307, positioning pins 307a and shaft 308.

The base 301 is fixed substantially in parallel to the back plate 68 to only the upper portion by means of screws or the like to thereby fix the correcting mechanism 300 per se to the back plate 68. A recess portion 321 that is composed of a top surface 321a, a bottom surface 321b and a vertical surface 321c is formed on the surface opposite (hereinafter referred to as top surface) to the back plate 68 side in the lower portion of the base 301. Also, pressurized gas introduction ports 323, 324 that are pressure medium introduction ports are provided on the surface on the back plate side (hereinafter referred as rear side surface). The pressurized gas introduced through the ports is introduced into the recess portion 321 from the top surface 321a and the bottom surface 321b through gas passages 325 and 326 that are medium flow paths formed in the interior of the base 301.

Namely, in this embodiment, the correcting drive member is constituted by the pistons driven by the pressurized gas and the cylinder syringes for receiving the pistons and the correcting drive means is constituted by a pair of correcting drive members.

A guide groove is provided in the drive direction (hereinafter referred to as vertical direction) of the balancing actuators 70A and 70B in the guide bracket 306. The surface side where guide groove is formed is faced to the top surface side of the base 301 so that the shaft 308 is held slidable in the vertical direction in the guide groove. The shaft 308 has a convex portion 308a received in the recess portion 321 and a pin 308b projecting in a direction different from the vertical direction in the lower portion in the vertical direction. The recess portions 321 further receives the pistons 304 and 305 in contact with the convex portion 308a at upper surface and downward surface thereof in the vertical direction and the cylinder syringes 302 and 303 for receiving the pistons 304 and 305 slidably in the vertical direction, respectively.

For instance, in the case where the pressurized gas is introduced into the pressurized air introduction port 323, the pressurized air that reaches the top surface 321a through the gas flow path 325 drives the piston 304 within the cylinder syringe 302 downwardly in the vertical direction. The piston 305 is also in contact with the convex portion 308a of the shaft 308. However, in this case, since the force of the piston 304 for driving downwardly the convex portion 308a is stronger, the shaft 308 and the pin 308b are driven downwardly. Also, in the case where the shaft 308 and the pin 308b are to be driven upwardly, it is sufficient to introduce the pressurized gas into the pressurized gas introduction port 324. It is possible to adjust the drive amount of the shaft 308 and the pin 308b by the adjustment of the pressure balance of the gas to be introduced to the port 323 and the port 324.

As shown by dotted lines in FIG. 23, the jig 94 holding the object 92 to be polished positions so as to clamp guide bracket 306 by the base 301 and the jig 94 by using the positioning pins 307a, and is fixed and held by using the fixing pin 307. Incidentally, in this embodiment, since it is impossible to obtain the sufficient number of the contact points to the resistance measurement terminals 128 due to the work for the guide groove or the like, the probe units 109 and 110 made of a plurality of resistance measurement terminals 128 or the like are not provided directly to the guide bracket 306. For this reason, unlike the first embodiment, the probe units 109 and 110 are discrete units from the guide bracket 306 that may be removed. The guide bracket 306 is fixed by using the fixing pin 307 to the opposite surface of the facing surface to the guide bracket 306 of the jig 94.

It is possible to use the jig 94 as exemplified in the first embodiment except that the surface thereof where the electrodes electrically connected to the additional electrode by wire bonding is formed in advance is the opposite surface to the facing surface, of the guide bracket 307. Namely, when the jig 94 is fixed to the base 301, the spherical portion at the tip end of the pin 308b is inserted into the load receiving hole 146. According to the drive of the pistons 304 and 305, the tip end of the pin 308b depresses the circumferential portion of the load receiving hole 146 to drive the loading receiving portion 145 up and down. The movement of the load receiving portion 145 deforms locally the holding portion 132 and simultaneously gives a local deformation also to the object 92 to be polished.

Incidentally, since the interval between the tip end portions of the adjacent pins 308b is large in comparison with the size of the pistons 304 and 305 used in this embodiment (in this case, the cross-sectional area in the direction perpendicular to the drive direction) or the size of the pressurized air gas introduction ports 323 and 324 (more exactly, an outer diameter of a connector used when a tube for introduction of the pressurized air to each port is connected), it is possible to arrange simply these components in parallel with each other. However, in the case where it is necessary to reduce the interval between the pin tip portions in comparison with the size of these pistons or the ports, it is possible to arrange the respective adjacent pistons, i.e., the adjacent recess portions for receiving the pistons in astaggered manner, to arrange the respective adjacent ports in the staggered manner or to combine these components.

Figure 24:
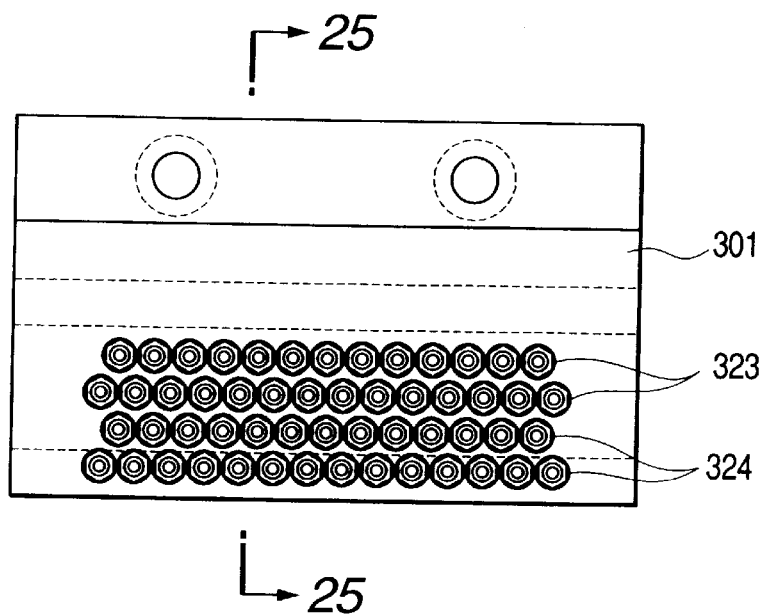
FIG. 24 is a view showing a rear surface of the correcting mechanism where adjacent pressurized medium introduction ports are arranged in a staggered manner in the third embodiment.
Figure 25:
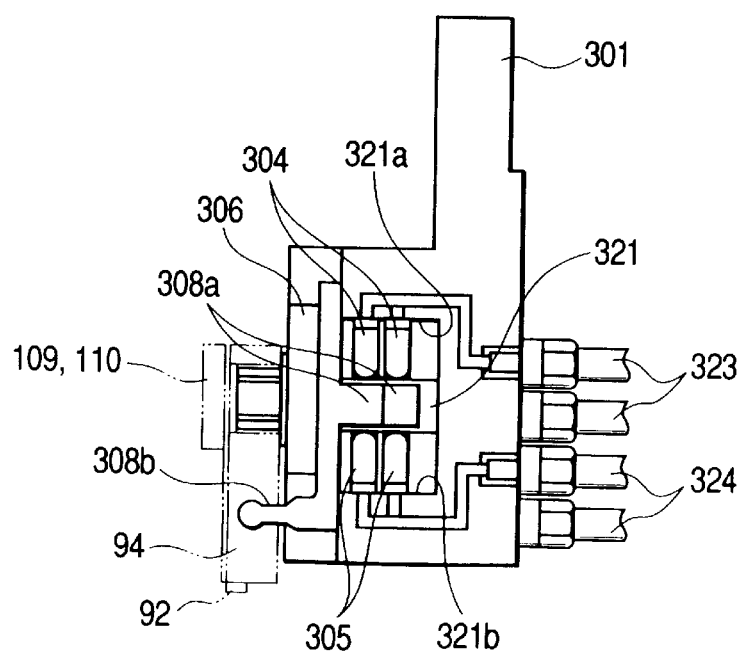
FIG. 25 is a schematic cross-sectional view taken along the line 25—25 in the correcting mechanism shown in FIG. 24.

The example in which these components are combined is shown in FIGS. 24 and 25. FIG. 24 is a view of the base 301 as viewed from the rear side. FIG. 25 is a view corresponding to FIG. 23 of the embodiment in which the ports are not arranged in a staggered manner. As is apparent from FIG. 24, it is possible to increase the number of the ports considerably in comparison with the case where the ports 323 and 324 are arranged in parallel. Furthermore, as shown in FIG. 25, not only is the arrangement of the ports 323 and 324 displaced but also the depths of the adjacent recess portions 321 are different to arrange the cylinder syringes and the pistons not in parallel but in a staggered manner. With such an arrangement, it is possible to reduce the interval between the adjacent pins 308b not depending upon the size of the pistons and the ports.

The arrangement of the ports and the pistons in this modification is simply an example and the arrangement may be displaced more complicatedly so as to make it possible to reduce the distance between the adjacent pins more. Also, in this embodiment, the pressurized gas is used as the drive source. It is however possible to use the liquid such as hydraulic fluid. Also, in this embodiment, the correcting drive means is constituted by a pair of correcting drive members composed of the pistons the cylinder syringes and the like. However, it is possible to compose one of the correcting drive members of piston, cylinder syringe and the like, and the other correcting drive member of elastic material such as spring or rubber. Furthermore, the modifications or the like of each structure described in conjunction with the mode of the first embodiment such as the modification of the structure of the balancing actuators may be applied to this embodiment in the same manner.

(Fourth Embodiment)

A polishing apparatus for a magnetic head in accordance with a fourth embodiment of this invention will now be described with reference to the accompanying drawings. Incidentally, since the difference between the third embodiment and the fourth embodiment is the structure of the bend correcting mechanism 300 and the bend correcting mechanism 400, the duplicated description as to the portions except for the correcting mechanisms 400, the control blocks for detecting the necessary polishing amount of the object 92 to be polished or the like in the overall structure of the apparatus will be omitted. The correcting mechanism 400 in accordance with the fourth embodiment of this invention will now be described in detail.

Figure 26:
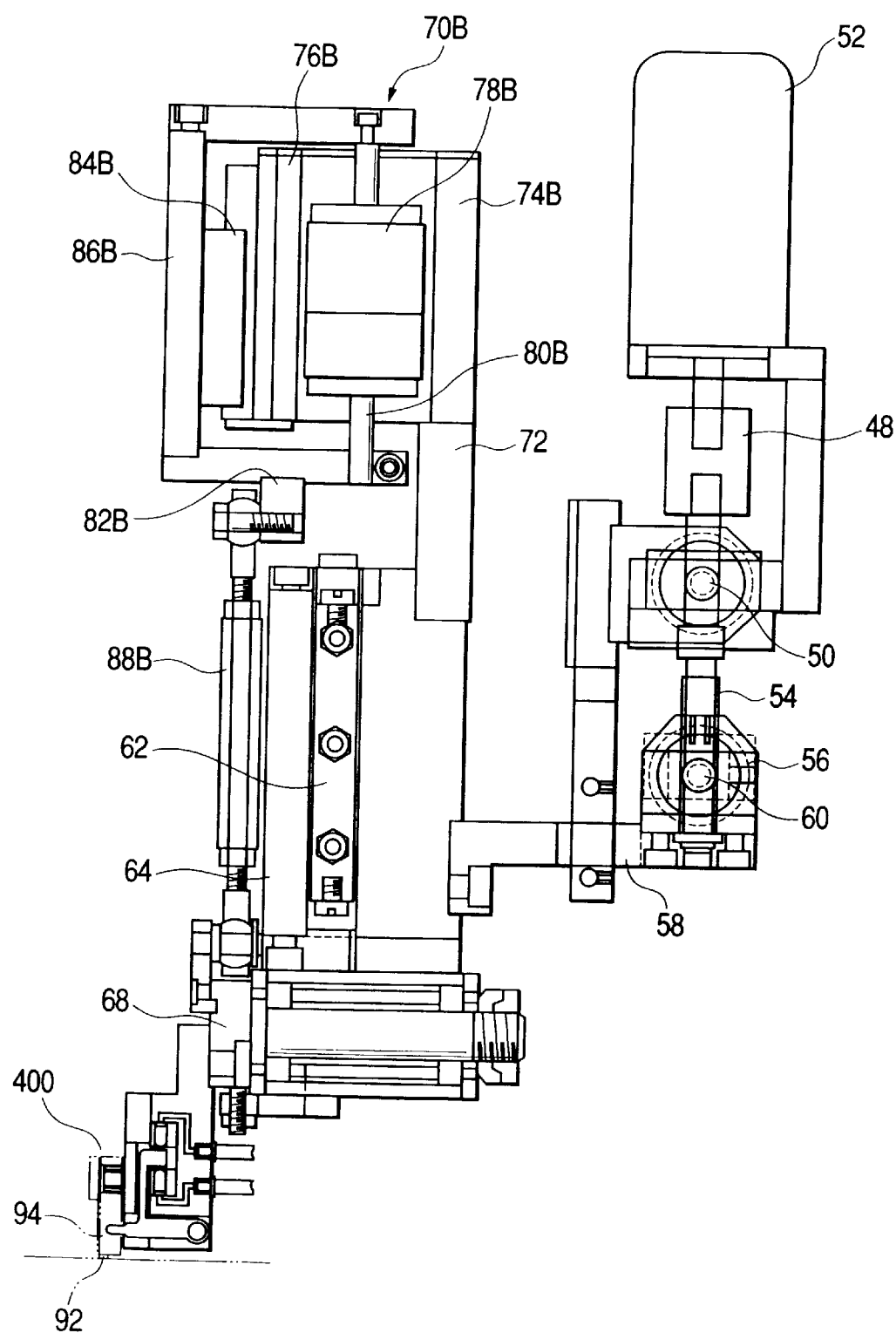
FIG. 26 is a side elevational cross-sectional view of a polishing head according to a fourth embodiment of the invention.
Figure 27:
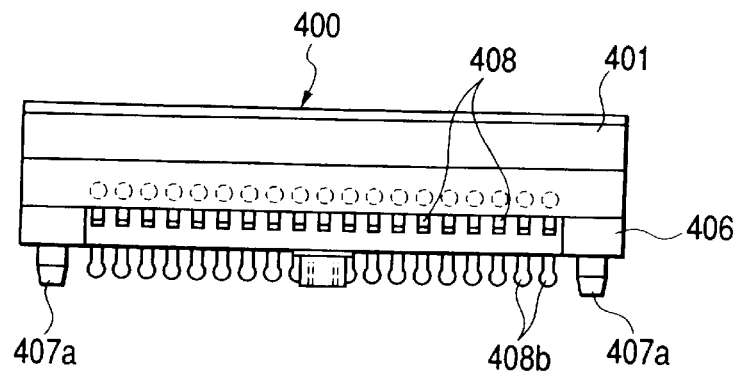
FIG. 27 is a plan view of a correcting mechanism in accordance with the fourth embodiment of the present invention.
Figure 28:
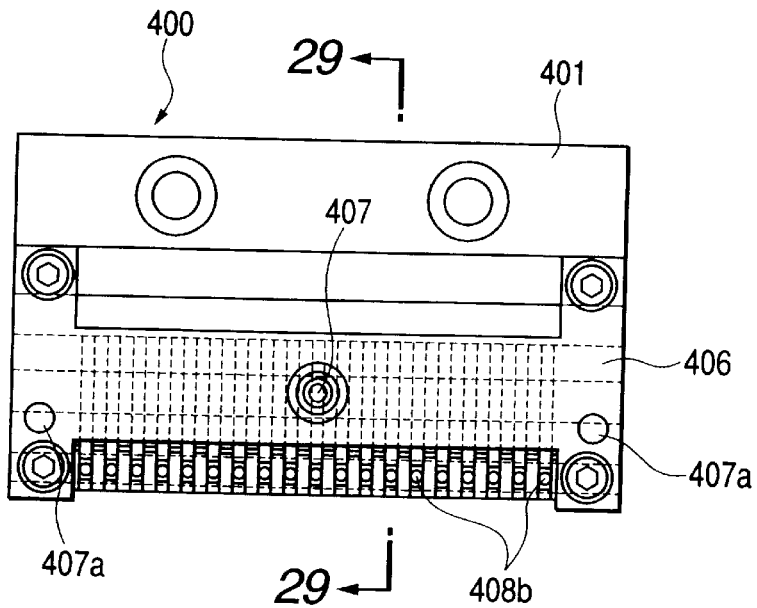
FIG. 28 is a frontal view of the correcting mechanism shown in FIG. 27.
Figure 29:
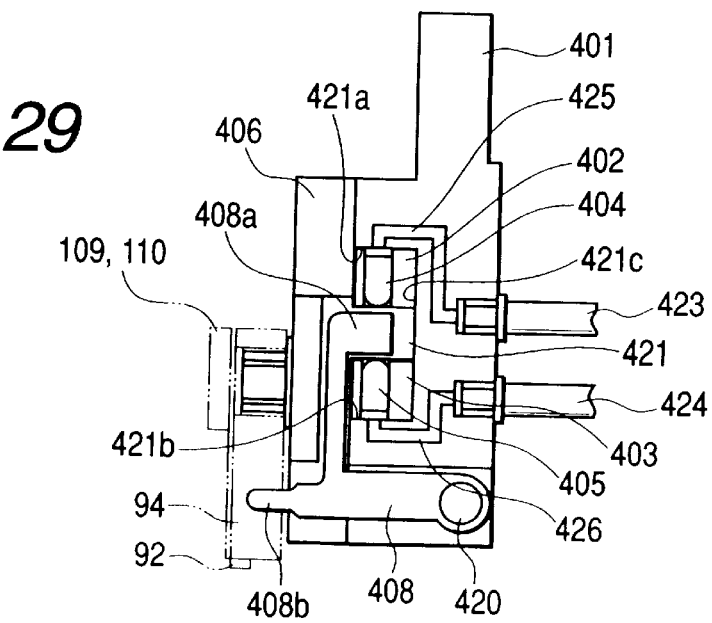
FIG. 29 is a schematic cross-sectional view taken along the line 29—29 of the correcting mechanism shown in FIG. 28.

FIG. 26 is a side elevational view of the polishing head according to this embodiment. FIGS. 27, 28 and 29 are a plan view, a frontal view and a cross-sectional view taken along the line 29—29 of FIG. 28, respectively of the correcting mechanism 400 in accordance with this embodiment. The correcting mechanism 400 in accordance with this embodiment is composed of a base 401, cylinder syringes 402, 403, pistons 404, 405, a guide bracket 406, a positioning (fixing) pin 407, positioning pins 407a and levers 408.

The base 401 is fixed substantially in parallel to the back plate 68 to only the upper portion by means of screws to thereby fix the correcting mechanism 400 per se to the back plate 68. A recess portion 421 that is composed of a top surface 421a, a bottom surface 421b and a vertical surface 421c is formed on the surface opposite (hereinafter referred to as top surface) to the back plate 68 in the lower portion of the base 401. Also, pressurized gas introduction ports 423, 424 that are pressure medium introduction ports are provided on the surface on the back plate side (hereinafter referred as to as rear side surface). The pressurized gas introduced through the ports is introduced into the top surface 421a and the bottom surface 421b through gas passages 425 and 426 that are medium flow paths formed in the interior of the base 401.

A guide groove is provided in the drive direction (hereinafter referred to as vertical direction) of the balancing actuators 70A and 70B in the guide bracket 406. The surface side where the guide groove is formed is faced to the top surface side of the base 401 so that the lever 408 is held slidable in the vertical direction in the guide groove. The lever 408 is composed of a linear shaped portion which pivotally supported at one end about a shaft 420 which is supported by the base 401 and provided at the other end with the pin 408b, and a driven portion fixed at one end to this linear shaped portion and provided at the other end with a convex portion 408a received in the recess portion 421 and received in the guide groove except for the convex portion 408a. The recess portions 421 further receives the pistons 404 and 405 in contact with the convex portion 408a up and down in the vertical direction of the convex portion 408a, and the cylinder syringes 402 and 403 for receiving the pistons 404 and 405 slidably in the vertical direction, respectively.

For instance, in the case where the pressurized gas is introduced into the pressurized air introduction port 423, the pressurized air that reaches the top surface 421a through the gas flow path 425 drives the piston 404 within the cylinder syringe 402 upwardly in the vertical direction. The piston 405 is also in contact with the convex portion 408a of the lever 408. However, in this case, since the force of the piston 404 for driving downwardly the convex portion 408a is stronger, the convex portion 408a is driven substantially downwardly. The convex portion 408a is driven downwardly, to rotationally drive the lever 408 about the shaft 420, so that the pin 408b is moved substantially in the vertical direction. Also, in the case where the lever 408 and the pin 408b are to be driven substantially upwardly, it is sufficient to introduce the pressurized gas into the pressurized gas introduction port 424. It is possible to adjust the drive amount of the lever 408 and the pin 408b by the adjustment of the pressure balance of the gas to be introduced to the port 423 and the port 424.

Incidentally, since the fixture of the jig 94 to the base 401, the fixture of the probe units 109 and 110, the deformation of the jig 94 and the object 92 to be polished due to the insertion of the tip end portion of the pin 408b into the load receiving hole 146 of the jig 94 and the like are the same as those of the third embodiment, the detailed explanation thereof will be omitted.

Incidentally, since the interval between the tip end portions of the adjacent pins 408b is large in comparison with the size of the pistons 404 and 405 used in this embodiment (in this case, the cross-sectional area in the direction perpendicular to the drive direction) or the size of the pressurized air gas introduction ports 423 and 424, it is possible to simply arrange these components in parallel with each other. However, in the case where it is necessary to reduce the interval between the pin tip portions in comparison with the size of these pistons or the ports, it is possible to arrange the respective adjacent pistons, i.e., the adjacent recess portions for receiving the pistons in a staggered manner, to arrange the respective adjacent ports in the staggered manner or to combine these components.

Figure 30:
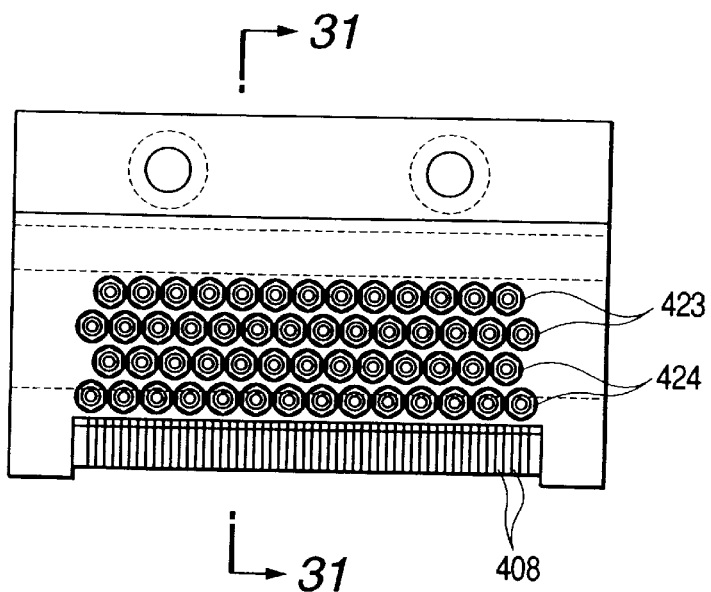
FIG. 30 is a view showing a rear surface of the correcting mechanism where adjacent pressurized medium introduction ports are arranged in a staggered manner in the fourth embodiment.
Figure 31:
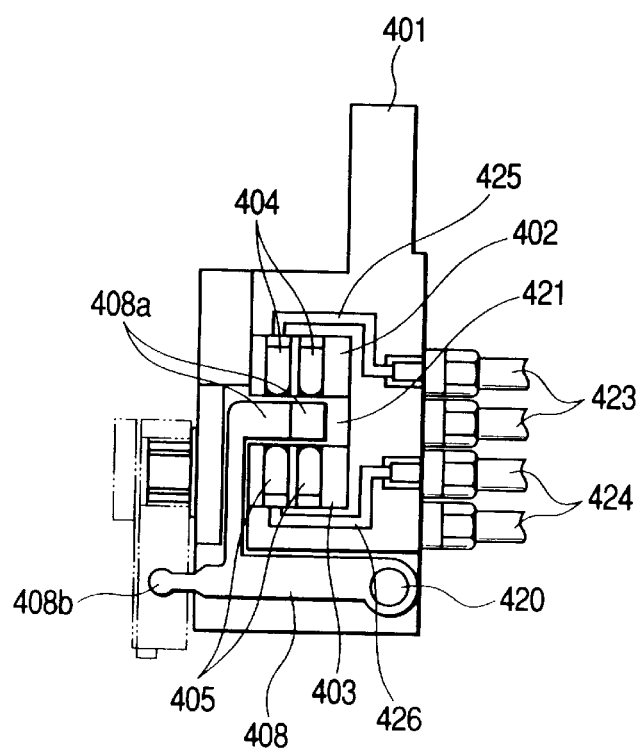
FIG. 31 is a schematic cross-sectional view taken along the line 31—31 in the correcting mechanism shown in FIG. 30.

The example in which these components are combined is shown in FIGS. 30 and 31. FIG. 30 is a view of the base 401 as viewed from the rear side. FIG. 31 is a view corresponding to the embodiment of FIG. 29 in which the ports are not arranged in a staggered manner. As is apparent from FIG. 30, it is possible to increase the number of the ports considerably in comparison with the case where the ports are arranged in parallel. Furthermore, as shown in FIG. 31, not only is the arrangement of the ports displaced but also the depths of the adjacent recess portions 421 are different to arrange the cylinder syringes and the pistons not in parallel but in a staggered manner. With such an arrangement, it is possible to reduce the interval between the adjacent pins 408b not depending upon the size of the pistons and the ports.

The arrangement of the ports and the pistons in this modification is simply an example and the arrangement may be displaced more complicatedly so as to make it possible to reduce the distance between the adjacent pins more. Also, in this embodiment, the pressurized gas is used as the drive source. It is however possible to use the liquid such as hydraulic fluid. Furthermore, the modifications or the like of each structure described in conjunction with the mode of the first embodiment, such as the modification of the structure of the balancing actuators, may be applied to this embodiment in the same manner.

According to the machining apparatus and machining method according to this invention, it is possible to impart the complicated deformation or the like to the object to be machined such as a ceramic bar, and to thus suppress the non-uniformity of the machining amount of the object to be machined upon the machining work of the object to be machined.

What is claimed is:

1. A method for machining an object elongated in one direction held on a jig and depressed onto a machining surface formed in a machining base that is rotationally driven through said jig, said method comprising:

measuring a machining amount at a plurality of positions of the object to be machined when the object to be machined is depressed against said machining surface; and rotating a plurality of levers, each of which has a pin at an end thereof, together with said pins by a plurality of correcting drive means on the basis of the measured machining amount for imparting a predetermined deformation to the object to be machined together with said jig by the rotation of each of said pins, whose tip end is received within said jig.

2. A method for machining an object elongated in one direction held on a jig and depressed onto a machining surface formed in a machining base that is rotationally driven through said jig, said method comprising:

measuring a machining amount at a plurality of positions of the object to be machined when the object to be machined is depressed against said machining surface; and driving a plurality of shafts, disposed on the same axis with a plurality of correcting drive means and having pins, on the basis of the measured machining amount for imparting a predetermined deformation to the object to be machined together with said jig by the drive along the axes of said pins with tip ends received in said jig.

3. A method for machining an object elongated in one direction held on a jig and depressed onto a machining surface formed in a machining base that is rotationally driven through said jig, said method comprising:

measuring a machining amount at a plurality of positions of the object to be machined when the object to be machined is depressed against said machining surface; and linearly driving a plurality of shafts having pins by a pair of correcting drive means disposed on a plurality of straight lines on the basis of the measured machining amount and imparting a predetermined deformation onto the object to be machined and said jig by the drive on the straight lines of said pins, wherein a tip end of each of said pins is received in said jig.

4. A machining apparatus for machining an object elongated in one direction, said apparatus comprising:

a machining base with a machining surface to be rotationally driven;

a machining head mounted frame disposed movably to said machining surface; and a machining head supported by said machining head mounted frame, wherein said machining head includes a jig for holding the object to be machined, an up-and-down moving portion moving up and down relative to the machining surface together with said jig, and a correcting mechanism supported by said up-and-down moving portion, said correcting mechanism includes a plurality of correcting drive means and a plurality of driven portions each of which has a pin, said jig includes a body portion fixed to said up-and-down moving portion, a holding portion elongated in one direction and fixed to said body portion for holding said object to be machined, and a plurality of load receiving portions arranged in parallel in said one direction on said holding portion, and said load receiving portions receive said pins and are driven in accordance with a movement of each driven portion whereby portions corresponding to said load receiving portions in said holding portion are partially deformed together with said object to be machined.

5. A machining apparatus for machining an object elongated in one direction, said apparatus comprising:

a machining base with a machining surface to be rotationally driven;

a machining head mounted frame disposed movably to said machining surface; and a machining head supported by said machining head mounted frame, wherein said machining head includes a jig for holding the object to be machined, an up-and-down moving portion moving up and down relative to the machining surface together with said jig, and a correcting mechanism supported by said up-and-down moving portion, said correcting mechanism includes a base fixed to said up-and-down moving portion, a plurality of levers having pins at ends thereof, a shaft fixed to said base for rotatably supporting said levers, and a plurality of correcting drive means coupled to other ends of said levers for pivoting said levers with respect to said shaft to thereby pivot said pins, said jig includes a body portion fixed to said tip-and-down moving portion, a holding portion elongated in one direction and fixed to said body portion for holding said object to be machined, and a plurality of load receiving portions arranged in parallel in said one direction on said holding portion, and said load receiving portions receive said pins and are driven in accordance with a pivotal movement of each pin whereby portions corresponding to said load receiving portion in said holding portion are deformed together with said object to be machined.

6. An apparatus according to claim 5, wherein tip ends of said pins are substantially spherical.

7. An apparatus according to claim 5, wherein adjacent levers of said plurality of levers have different lengths from each other, and distances between said plurality of correcting drive means and said shaft are different from each other in accordance with a length of said levers.

8. An apparatus according to claim 5, wherein said shaft supports said levers in a position in the vicinity of said pins.

9. An apparatus according to any one of claims 5 to 8, wherein said correcting drive means are REC plungers.

10. A machining apparatus for machining an object elongated in one direction, said apparatus comprising:
a machining base with a machining surface to be rotationally driven;
a machining head mounted frame disposed movably to said machining surface; and
a machining head supported by said machining head mounted frame, wherein
said machining head includes a jig for holding the object to be machined, an up-and-down moving portion moving up and down relative to the machining surface together with said jig, and a correcting mechanism supported by said up-and-down moving portion,
said correcting mechanism includes a base fixed to said up-and-down moving portion, a plurality of correcting drive means fixed to said base at an end of each of said correcting drive means, a shaft coupled coaxially with said correcting drive means, and pins projecting from said shaft,
said jig includes a body portion fixed to said up-and-down moving portion, a holding portion elongated in one direction and fixed to said body portion for holding said object to be machined, and a plurality of load receiving portions arranged in parallel in said one direction on said holding portion, and
said load receiving portions receive said pins and are driven in accordance with a movement of each pin whereby portions corresponding to said load receiving portion in said holding portion are deformed together with said object to be machined.

11. A machining apparatus for machining an object, elongated in one direction, to be machined, comprising:
a machining base with a machining surface to be rotationally driven, a machining head mounted frame disposed movably to said machining surface, and a machining head supported by said machining head mounted frame, wherein
said machining head includes a jig for holding the object to be machined, an up-and-down moving portion moving up and down relative to the machining surface together with said jig, and a correcting mechanism supported by said up-and-down moving portion,
said correcting mechanism includes a base fixed to said up-and-down moving portion, a plurality of frame members fixed to said base, a plurality of correcting drive means held on centerlines of said frame members, and a plurality of shafts extending in parallel with a drive direction of said correcting drive means, an end of each of said shafts being coupled with each of said frame members and the other end of each of said shafts being provided with a pin,
said jig includes a body portion fixed to said up-and-down moving portion, a holding portion elongated in one direction and fixed to said body portion for holding said object to be machined, and a plurality of load receiving portions arranged in parallel in said one direction on said holding portion, and
said load receiving portions receive said pins and are driven in accordance with a pivotal movement of each pin whereby portions corresponding to said load receiving portion in said holding portion are deformed together with said object to be machined.

12. An apparatus according to claim 10 or 11, wherein tip ends of said pins are substantially spherical.

13. An apparatus according to claim 10 or 11, wherein the adjacent levers each have different lengths from each other, and distances between said correcting drive means and said pins are different from each other in accordance with a length of said shaft.

14. An apparatus according claim 11, wherein said shafts are arranged coaxially with said correcting drive means.

15. An apparatus according to claim 10 or 11, wherein said correcting drive means are piezoelectric element actuators.

16. A machining apparatus for machining an object elongated in one direction, said apparatus comprising:
a machining base with a machining surface to be rotationally driven;
a machining head mounted frame disposed movably to said machining surface; and
a machining head supported by said machining head mounted frame, wherein
said machining head includes a jig for holding the object to be machined, an up-and-down moving portion moving up and down relative to the machining surface together with said jig, and a correcting mechanism supported by said up-and-down moving portion,
said correcting mechanism includes a plurality of shafts, each of which has a pin at one end thereof and a convex portion having two sides, a pair of correcting drive members disposed on one line on both sides of said convex portions and clamping said convex portions, and a base fixed to said up-and-down moving portion with recess portions receiving said pair of correcting drive members and said convex portions, said pair of correcting drive members drive said convex portion in a straight line to drive said shafts and said pins in parallel with said straight line,
said jig includes a body portion fixed to said up-and-down moving portion, a holding portion elongated in one direction and fixed to said body portion for holding said object to be machined, and a plurality of load receiving portions arranged in parallel in said one direction on said holding portion, and
said load receiving portions receive said pins and are driven in accordance with the movement of each pin whereby portions corresponding to said load receiving portion in said holding portion are deformed together with said object to be machined.

17. An apparatus according to claim 16, wherein tip ends of said pins are substantially spherical.

18. An apparatus according to claim 16, wherein sizes of projections of the convex portions adjacent to each other are different from each other and an arrangement of said correcting drive members each received in said recess portion and a size of said recess portions are defined in accordance with the sizes of said convex portions.

19. An apparatus according to claim 16 or 18, wherein said pressure medium is pressurized air.

20. An apparatus according to claim 16 or 18, wherein said pair of correcting drive members have a pair of pistons to be driven by pressure medium, and said base has a pair of pressure medium introduction ports in communication with a rear portion of each of said pair of pistons.

21. An apparatus according to claim 20, wherein said pair of adjacent pressure medium introduction ports are each arranged at different distances from a predetermined surface of said base.

22. An apparatus according to claim 16 or 18, wherein one of said pair of correcting drive members has a pressure-driven piston and the other is formed of an elastic member, and said base has a pressure port in communication with a rear portion of said piston.

23. An apparatus according to claim 22, wherein said adjacent pressure medium introduction ports are each arranged at different distances from a predetermined surface of said base.

24. A machining apparatus for machining an object elongated in one direction, said apparatus comprising:
a machining base with a machining surface to be rotationally driven;
a machining head mounted frame disposed movably to said machining surface; and
a machining head supported by said machining head mounted frame, wherein
said machining head includes a jig for holding the object to be machined, wherein said jig includes an up-and-down moving portion moving up and down relative to the machining surface together with said jig, and correcting mechanism supported by said up-and-down moving portion,
said correcting mechanism includes a shaft, a plurality of levers composed of linear portions, each of which is provided with a pin at an end thereof and rotatably supported by said shaft at a portion thereof different from said pin and driven portions coupled at end portions with said linear portions having convex portions, each of said convex portions having two sides, a pair of correcting drive members disposed in a linear manner on both sides of said convex portions while clamping the convex portions, and a base having recess portions for receiving said pair of correcting drive members and said convex portions and fixed to said up-and-down moving portion, said pair of correcting drive members driven in the linear manner so as to drive the convex portion clamped by said pair of correcting drive members, whereby said levers and said pins are pivoted about said shaft,
said jig includes a body portion fixed to said up-and-down moving portion, a holding portion elongated in one direction and fixed to said body portion for holding said object to be machined, and a plurality of load receiving portions arranged in parallel in said one direction on said holding portion, and
said load receiving portions receive said pins and are driven in accordance with the pivotal movement of each pin whereby portions corresponding to said load receiving portion in said holding portion are deformed together with said object to be machined.

25. An apparatus according to any one of claims 5, 10, 11, 16 and 24, wherein said jig has an electrode to be connected to an electric element formed on the object to be machined, and said correcting mechanism has a probe unit to be brought into contact with said electrode.

26. An apparatus according to claim 25, wherein said machining head has a balancing actuator, said jig has through holes in a central portion thereof and at end portions with respect to a longitudinal direction of said jig, said jig is supported by said correcting mechanism by a fixing pin passing through said through hole in the central portion, and said jig is depressed to a direction toward said machining surface through said positioning pins at both end portions by the balancing actuator.

27. An apparatus according to claim 25, wherein said machining head is supported through an adjust ring supported by said machining head mounted frame and in contact with said machining surface and an angle of said machining head supported by said machining head mounted frame facing said machining surface is defined by said adjust ring.

28. An apparatus according to claim 25, wherein said machining head is mounted rotatably to rails for mounting said machining head.

29. An apparatus according to claim 28, further comprising a machining head swinging means, wherein said machining head swinging means perform reciprocating rotational motion of said machining head within a predetermined angular range.

30. An apparatus according to claim 25, wherein said object to be machined is a ceramic rod provided with a plurality of magnetic heads.

31. An apparatus according to claim 24, wherein tip ends of said pins are spherical.

32. An apparatus according to claim 24, wherein sizes of projections of the adjacent convex portions are different from each other and the arrangement of said correcting drive members each received in said recess portion and a size of said recess portions are defined in accordance with the sizes of said convex portions.

33. An apparatus according to claim 24 or 32, wherein one of said pair of correcting drive members has a pressure-driven piston and the other is formed of an elastic member, and said base has a pressure port in communication with a rear portion of said piston.

34. An apparatus according to claim 33, wherein said adjacent pressure medium introduction ports are each arranged at different distances from a predetermined surface of said base.

35. An apparatus according to claim 33, wherein tip end portions of said pistons are substantially spherical 36. An apparatus according to claim 24 or 32, wherein said pressure medium is pressurized air.

37. An apparatus according to claim 24 or 32, wherein said pair of correcting drive members have a pair of pistons to be driven by pressure medium, and said base has a pair of pressure medium introduction ports in communication with a rear portion of each of said pair of pistons.

38. An apparatus according to claim 37, wherein said pair of adjacent pressure medium introduction ports are each arranged at different distances from a predetermined surface of said base.

39. An apparatus according to claim 37, wherein tip end portions of said pistons are substantially spherical.

* * * * *